(12) United States Patent
Kanaoka et al.

(10) Patent No.: US 10,725,413 B2
(45) Date of Patent: Jul. 28, 2020

(54) IMAGE FORMING APPARATUS, CONTROL PROGRAM, AND CONTROL METHOD

(71) Applicant: SHARP KABUSHIKI KAISHA, Sakai, Osaka (JP)

(72) Inventors: Yukio Kanaoka, Sakai (JP); Masaaki Aida, Sakai (JP); Hidetoshi Fujimoto, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/486,739

(22) PCT Filed: Feb. 14, 2018

(86) PCT No.: PCT/JP2018/005027
§ 371 (c)(1),
(2) Date: Aug. 16, 2019

(87) PCT Pub. No.: WO2018/155274
PCT Pub. Date: Aug. 30, 2018

(65) Prior Publication Data
US 2019/0377294 A1 Dec. 12, 2019

(30) Foreign Application Priority Data
Feb. 24, 2017 (JP) .................................. 2017-033819

(51) Int. Cl.
*G06K 15/00* (2006.01)
*G03G 15/00* (2006.01)
(Continued)

(52) U.S. Cl.
CPC .......... *G03G 15/5016* (2013.01); *G01S 17/04* (2020.01); *G03G 15/5087* (2013.01);
(Continued)

(58) Field of Classification Search
CPC .......... G03G 15/5016; G03G 15/5087; G03G 15/6552; G06F 3/1204; G06F 3/1285
See application file for complete search history.

(56) References Cited

U.S. PATENT DOCUMENTS

2005/0200885 A1   9/2005   Nishizawa et al.
2013/0250344 A1   9/2013   Merriam et al.
(Continued)

FOREIGN PATENT DOCUMENTS

JP   2003-186462 A   7/2003
JP   2005-244656 A   9/2005
(Continued)

*Primary Examiner* — Clayton E. LaBalle
*Assistant Examiner* — Michael A Harrison
(74) *Attorney, Agent, or Firm* — ScienBiziP, P.C.

(57) ABSTRACT

To enable the content of a printed material to be easily checked and inconvenience when a user collects the printed material to be avoided.
An image forming apparatus 10 includes an image forming part (14) and a display panel 48, and the display panel 48 displays a preview image 110 corresponding to image data for printing an image on a sheet. For example, the preview image 110 is displayed on the display panel 48 from when a print job is started and the first sheet in the print job is fed until the last sheet in the print job is discharged into a sheet discharge part 16.

11 Claims, 19 Drawing Sheets

(51) Int. Cl.
*G06F 3/12* (2006.01)
*G01S 17/04* (2020.01)

(52) U.S. Cl.
CPC ....... *G03G 15/6552* (2013.01); *G06F 3/1204* (2013.01); *G06F 3/1285* (2013.01)

(56) References Cited

U.S. PATENT DOCUMENTS

| | | | |
|---|---|---|---|
| 2014/0126015 A1* | 5/2014 | Kaneko | G06K 15/1886 358/1.15 |
| 2015/0117890 A1 | 4/2015 | Yamada | |
| 2015/0178600 A1 | 6/2015 | Kadobayashi | |

FOREIGN PATENT DOCUMENTS

| | | |
|---|---|---|
| JP | 2010-283764 A | 12/2010 |
| JP | 2014-177091 A | 9/2014 |
| JP | 2014-200915 A | 10/2014 |
| JP | 2015-085560 A | 5/2015 |
| JP | 2015-120291 A | 7/2015 |
| JP | 2016-220009 A | 12/2016 |

\* cited by examiner

IMAGE FORMING APPARATUS, CONTROL PROGRAM, AND CONTROL METHOD

TECHNICAL FIELD

The present invention relates to an image forming apparatus, a control program, and a control method, and more particularly to an image forming apparatus for printing an image corresponding to image data on a recording medium, a control program, and a control method.

BACKGROUND ART

Patent Literature 1 discloses an example of an image forming apparatus of the background art. In the image forming apparatus of the background art, the time when a user arrives at the image forming apparatus is estimated based on the distance from the user to the image forming apparatus and the speed at which the user approaches the image forming apparatus. Furthermore, the image forming apparatus of the background art starts the print job requested by the user before the estimated time of arrival of the user so that the print job of the user is to be completed at the time when the user arrives at the image forming apparatus.

CITATION LIST

Patent Literature

[PTL 1]
Japanese Unexamined Patent Application Publication No. 2014-200915

SUMMARY OF INVENTION

Technical Problem

However, in the image forming apparatus of the background art, it is difficult for the user who comes to collect the printed material, to check whether it is the printed material that is printed by the print job requested by him/herself. When the user collects the printed material without checking the content, there is a possibility that the printed material of a different user is mistakenly collected.

Therefore, in the image forming apparatus of the background art, the user needs to check whether it is the material printed by the print job requested by the user before collecting the printed material. This is inconvenient because it is time-consuming to check the content of the printed material when the user collects the printed material.

Thus, the primary object of the present invention is to provide a novel image forming apparatus, a novel control program, and a novel control method.

Furthermore, another object of the present invention is to provide an image forming apparatus, a control program, and a control method, with which the content of a printed material can be easily checked and inconvenience when a user collects the printed material can be avoided.

Solution to Problem

A first invention is an image forming apparatus including a storage part, an image forming part, a condition determining part, and a display part. The storage part stores input image data. The image forming part prints, on a recording medium, an image corresponding to the image data stored in the storage part. The condition determining part determines whether a predetermined condition is satisfied. The display part includes a liquid crystal panel having an image display function of displaying an image on a display surface. The liquid crystal panel displays a preview image corresponding to the image data when the condition determining part determines that the predetermined condition is satisfied.

According to the first invention, as the preview image corresponding to the image data is displayed on the display part, it is easy for the person present near the image forming apparatus to check the content of the printed material, and it is possible to avoid inconvenience when the user collects the printed material.

A second invention is the image forming apparatus according to the first invention, wherein the predetermined condition is satisfied in response to printing of an image on the recording medium by the image forming part.

According to the second invention, the predetermined condition is satisfied when an image is printed on the recording medium in the image forming part, and the preview image is displayed on the display part; therefore, it is easy for the person present near the image forming apparatus to check the content of the printed material in the process of printing, and it is possible to avoid taking the wrong printed material.

A third invention is the image forming apparatus according to the first or the second invention, further including a person detecting part that detects a person present in a predetermined range around the image forming apparatus, wherein the predetermined condition is satisfied in response to detection of a person present in the predetermined range around the image forming apparatus by the person detecting part.

According to the third invention, as the person present in the predetermined range around the image forming apparatus, i.e., the person present near the image forming apparatus, may visually recognize the preview image, the content of the printed material may be checked, and taking the wrong printed material may be avoided.

A fourth invention is the image forming apparatus according to the third invention, further including an orientation detecting part that detects an orientation of a person present in the predetermined range around the image forming apparatus with respect to the image forming apparatus, wherein the display part changes an orientation of the preview image in accordance with the orientation, with respect to the image forming apparatus, of the person present in the predetermined range around the image forming apparatus as detected by the orientation detecting part.

According to the fourth invention, as the orientation of the preview image is changed in accordance with the orientation of the person present near the image forming apparatus with respect to the image forming apparatus, it is easy for the person present near the image forming apparatus to visually recognize the preview image. Thus, it is easy to check the content of the printed material, and it is possible to avoid taking the wrong printed material more effectively.

A fifth invention is the image forming apparatus according to the third or the fourth invention, wherein the predetermined condition ceases to be satisfied in response to non-detection of a person present in the predetermined range by the person detecting part in a state where the preview image is displayed.

According to the fifth invention, when there is no person near the image forming apparatus, the predetermined condition ceases to be satisfied, and the preview image is hidden, whereby the waste of electric power may be prevented.

A sixth invention is the image forming apparatus according to the first or the second invention, wherein the predetermined condition is satisfied in response to discharge of the recording medium on which the image is printed, into a sheet discharge part of the image forming apparatus.

According to the sixth invention, it is easy to check the content of the printed material discharged into the sheet discharge part, and it is possible to avoid taking the wrong printed material more effectively.

A seventh invention is the image forming apparatus according to the sixth invention, wherein the predetermined condition ceases to be satisfied in response to pullout of the recording medium from the sheet discharge part of the image forming apparatus when the preview image is displayed.

According to the seventh invention, even when it takes a long time until the user comes to collect the printed material after the printed material is discharged into the sheet discharge part, it is easy to check the content of the printed material, and it is possible to avoid taking the wrong printed material.

An eighth invention is the image forming apparatus according to the first or the second invention, further including: a receiving part that receives the image data transmitted from an external computer; and an approach determining part that determines whether an executing user who has given an instruction to transmit the image data has approached the image forming apparatus, wherein the storage part stores the image data received by the receiving part, and the image forming part prints, on a recording medium, an image corresponding to the image data stored in the storage part when the approach determining part determines that the executing user has approached the image forming apparatus.

According to the eighth invention, when it is determined that the executing user has approached the image forming apparatus, the image corresponding to the image data is printed on the recording medium, whereby the executing user may timely collect the printed material.

A ninth invention is the image forming apparatus according to the eighth aspect, wherein the predetermined condition is satisfied in response to a determination by the approach determining part that the executing user has approached the image forming apparatus.

According to the ninth invention, it is easy for the executing user to check the content of the printed material in the process of printing, and it is possible to avoid taking the wrong printed material.

A tenth invention is the image forming apparatus according to the ninth invention, wherein the display part displays, together with the preview image, a user information image for identifying the executing user when the condition determining part determines that the predetermined condition is satisfied.

According to the tenth invention, as the user information image for identifying the executing user is displayed on the display panel together with the preview image, it is easy to check the executing user, and it is possible to avoid taking the wrong printed material more effectively.

An eleventh invention is a control program for an image forming apparatus including: a storage part that stores input image data; an image forming part that prints, on a recording medium, an image corresponding to the image data stored in the storage part; and a display part, the control program causing a computer of the image forming apparatus to function as: a condition determining part that determines whether a predetermined condition is satisfied, and a display control part that causes the display part to display a preview image corresponding to the image data when the condition determining part determines that the predetermined condition is satisfied.

A twelfth invention is a control method for an image forming apparatus including: a storage part that stores input image data; an image forming part that prints, on a recording medium, an image corresponding to the image data stored in the storage part; and a display part, the control method including: (a) a step for determining whether a predetermined condition is satisfied; and (b) a step for causing the display part to display a preview image corresponding to the image data when it is determined that the predetermined condition is satisfied in the step (a).

According to each of the eleventh and the twelfth inventions, in the same manner as in the first invention, it is easy to check the content of the printed material, and it is possible to avoid the inconvenience when the user collects the printed material.

Advantageous Effects of Invention

According to the present invention, it is easy to check the content of the printed material, and it is possible to avoid the inconvenience when the user collects the printed material.

DESCRIPTION OF EMBODIMENTS

First Embodiment

Figure 1:
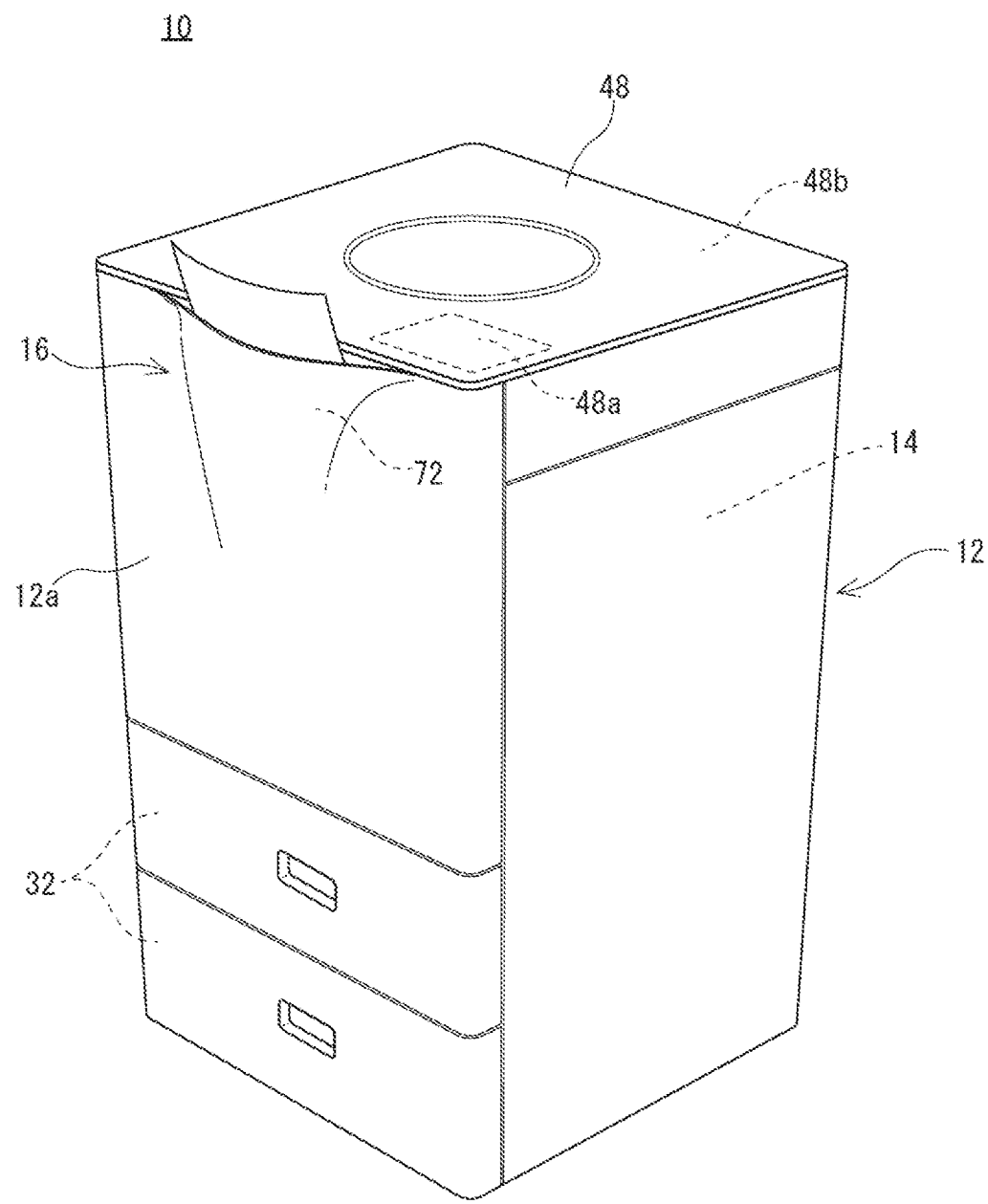
FIG. 1 is an illustrative view that illustrates an external appearance of an image forming apparatus according to a first embodiment of the present invention.
Figure 2:
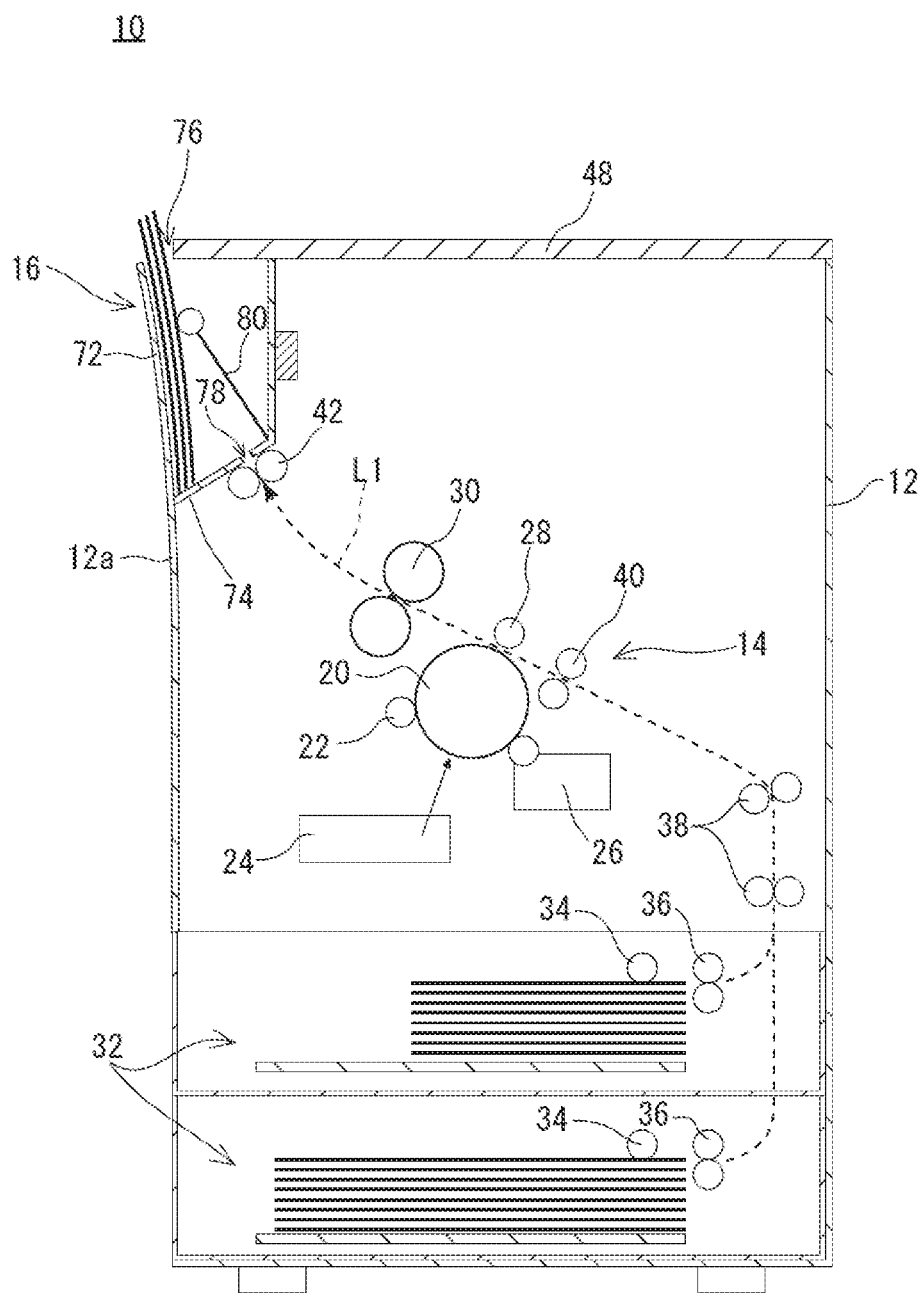
FIG. 2 is an illustrative view that schematically illustrates an internal structure of the image forming apparatus of FIG. 1.

FIG. 1 is an illustrative view that illustrates an external appearance of an image forming apparatus 10 according to a first embodiment of the present invention. FIG. 2 is an illustrative view that schematically illustrates an internal structure of the image forming apparatus 10 of FIG. 1.

With reference to FIG. 1, the image forming apparatus 10 according to the first embodiment of the present invention forms a multi-color or single-color image on a sheet (recording medium) by electrophotography and discharges the sheet having an image formed thereon to a sheet discharge part 16. Furthermore, the recording medium is not limited to a sheet made of paper, and a sheet other than the paper, such as an OHP film, is also used. According to the first embodiment, the image forming apparatus 10 is a multifunction peripheral (MFP: Multifunction Peripheral) having a copy function, a print function, a scanner function, a facsimile function, and the like.

In the first embodiment, a multifunction peripheral having a print function, a scanner function, and a facsimile function is described as the image forming apparatus 10; however, there is no need to impose a limitation on this, and the scanner function and the facsimile function may not be provided as long as at least the print function is provided.

Further, in this description, the front and back directions (depth direction) of the image forming apparatus 10 and its components are defined by using the surface opposing to the standing position of the user, i.e., the surface on the side where the sheet discharge part 16 described later is provided, as the front surface (front), and the left and right direction (lateral direction) of the image forming apparatus 10 and its components is defined based on the state in which the image forming apparatus 10 is viewed from the user.

First, the basic configuration of the image forming apparatus 10 is schematically described. As illustrated in FIGS. 1 and 2, the image forming apparatus 10 includes a casing 12 made of synthetic resin and having a substantially cuboidal shape in which an image forming part 14, and the like, are incorporated, and as described later in detail, the front-surface side upper portion inside the casing 12 is provided with the sheet discharge part 16 having a sheet pullout port 76 that is opened upward.

The image forming part 14 includes components such as a photosensitive drum 20, a charging roller 22, a writing unit 24, a developing unit 26, a transfer roller 28, and a fixing unit 30, forms an image on a sheet conveyed from a sheet feed part 32, or the like, provided in the lower portion of the casing 12, and discharges the sheet having an image formed thereon to the sheet discharge part 16. Further, the image data input to the image forming apparatus 10 is used as image data (print image data) for forming (printing) an image on a sheet. The image data input to the image forming apparatus 10 is, for example, the image data read from a document by using an image reading function described later or is the image data input from an external computer via a communication circuit 90 (see FIG. 7).

The photosensitive drum 20 is an image carrier having a photosensitive layer formed on the surface of a cylindrical conductive substrate, and the charging roller 22 is a member that charges the surface of the photosensitive drum 20 to a predetermined potential. Furthermore, the writing unit 24 is configured as a laser scanning unit (LSU) including a laser irradiator, a reflective mirror, and the like, and exposes the charged surface of the photosensitive drum 20 to form the electrostatic latent image corresponding to the image data on the surface of the photosensitive drum 20. The developing unit 26 develops the electrostatic latent image formed on the surface of the photosensitive drum 20 with toner.

The transfer roller 28 is provided to form a transfer nip portion with the photosensitive drum 20. During image formation, a predetermined voltage is applied to the transfer roller 28 so that a transfer electric field is formed in the transfer nip portion. Then, the toner image formed on the surface of the photosensitive drum 20 is transferred onto the sheet while the sheet passes through the transfer nip portion due to the effect of the transfer electric field.

The fixing unit 30 includes a heat roller, a pressure roller, and the like, and is located downstream of the transfer roller 28 in the sheet conveyance direction. The heat roller is set to have a predetermined fixing temperature, and when the sheet passes through the fixing nip portion between the heat roller and the pressure roller, the toner image transferred onto the sheet is melted, mixed, and pressed so that the toner image is thermally fixed to the sheet.

Further, in the casing 12, a sheet conveyance path L1 is formed to convey the sheet, fed from the sheet feed part 32 by a pickup roller 34 and a sheet feed roller 36, to the sheet discharge part 16 via the transfer nip portion and the fixing nip portion. The sheet conveyance path L1 is optionally provided with, for example, a conveyance roller 38 for applying a motive force to the sheet in an auxiliary manner, a registration roller 40 for feeding the sheet to the transfer nip portion at a predetermined timing, and a sheet discharge roller 42 for discharging a sheet having an image formed thereon to the sheet discharge part 16.

Figure 3:
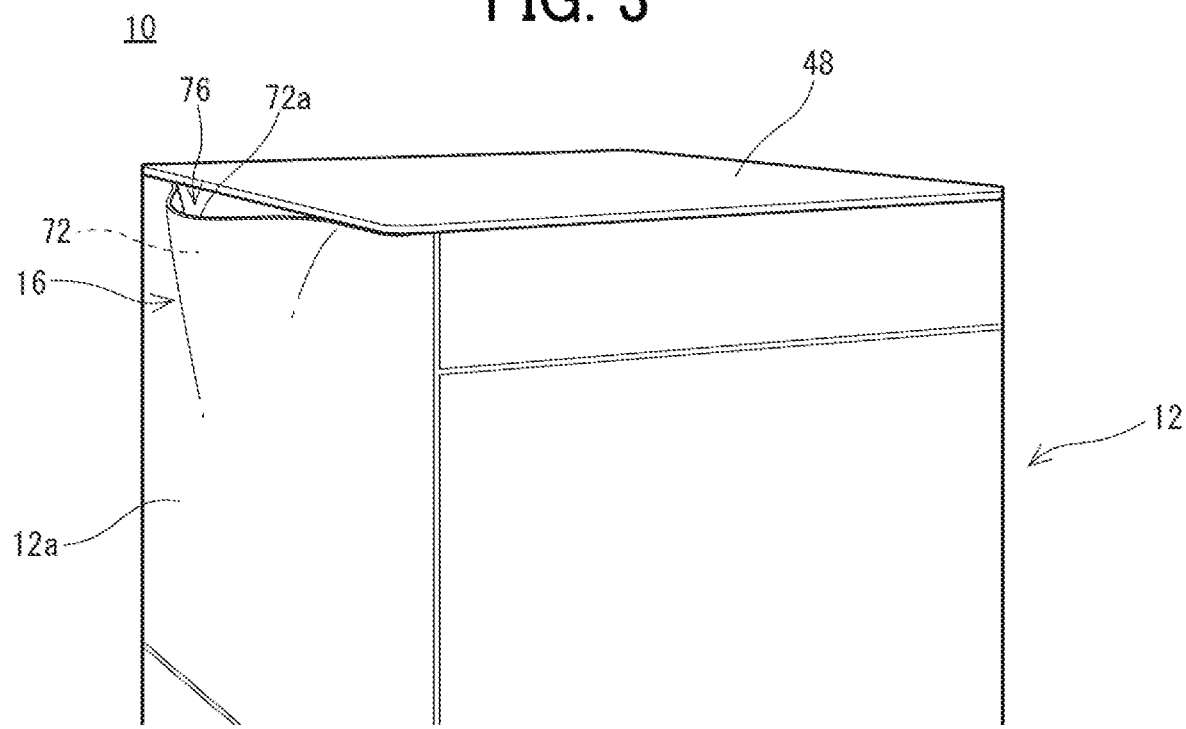
FIG. 3 is a perspective view that illustrates the top surface, the front-surface upper portion, and the right-side surface upper portion of the image forming apparatus of FIG. 1.
Figure 4:
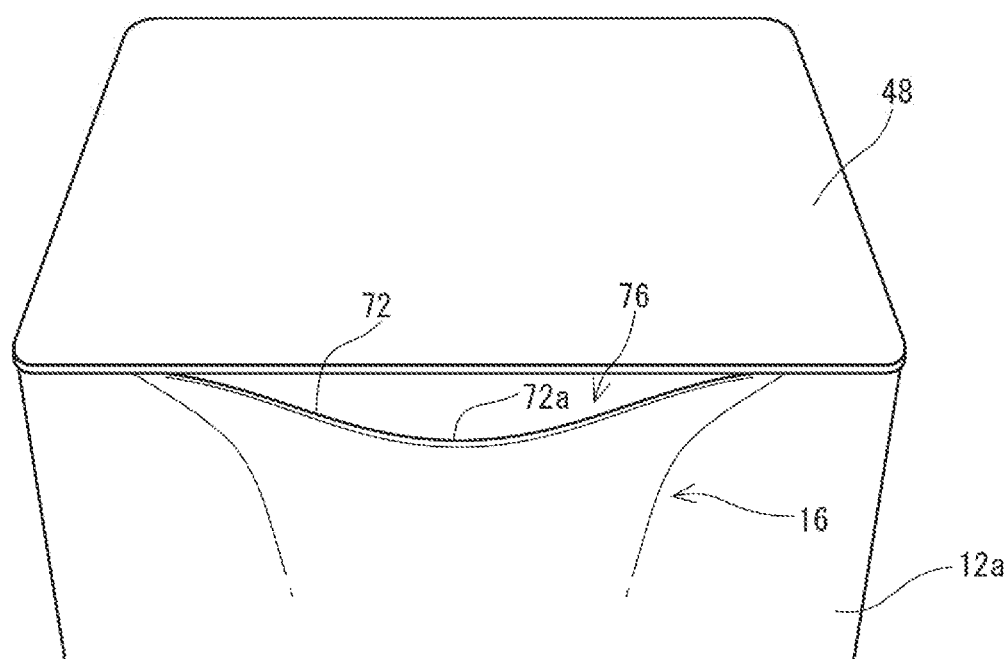
FIG. 4 is a perspective view that illustrates the top surface and the front-surface upper portion of the image forming apparatus of FIG. 1.

FIG. 3 is a perspective view that illustrates the top surface, the front-surface upper portion, and the right-side surface upper portion of the image forming apparatus 10 of FIG. 1. FIG. 4 is a perspective view that illustrates the top surface and the front-surface upper portion of the image forming apparatus 10 of FIG. 1.

As illustrated in FIGS. 3 and 4, the sheet discharge part 16 is provided with a sheet discharge space into which the sheet on which the image has been formed by the image forming part 14 is discharged (accommodated); it is disposed in a vertical direction at the peripheral portion inside the casing 12 and it is opened upward. According to the first embodiment, the sheet discharge part 16 is disposed in the front-surface side upper portion inside the casing 12.

Specifically, as illustrated in FIG. 2, the sheet discharge part 16 includes: a sheet discharge tray 72 that supports the front or back surface of a sheet having an image formed thereon and discharged into the sheet discharge part 16; a rear-end support part 74 that supports the rear end of the sheet in a sheet discharge direction; and the sheet pullout port 76 through which the sheet is pulled out of the sheet discharge part 16.

Furthermore, according to the first embodiment, the inner side of a front wall 12a of the casing 12 is used as the sheet discharge tray 72. That is, the sheet discharge tray 72 is integrally formed with the front wall 12a and is provided by extending in substantially a vertical direction, and the front side of the sheet discharge part 16 is covered with the front wall 12a that functions as the sheet discharge tray 72. Further, the rear-end support part 74 is provided by being slightly inclined downward toward the sheet discharge tray 72. At the end of the rear-end support part 74 on the opposite side of the sheet discharge tray 72, a sheet discharge port 78 for discharging a sheet having an image formed thereon to the sheet discharge part 16 is formed. The above-described sheet discharge roller 42 is provided under the sheet discharge port 78. Further, the sheet pullout port 76 is formed in the upper part of the sheet discharge space of the sheet discharge part 16 and is opened upward.

That is, according to the first embodiment, the sheet having an image formed thereon is discharged upward in substantially a vertical direction with respect to the sheet discharge part 16 (i.e., vertically placed) and is pulled upward by the user through the sheet pullout port 76 (see FIGS. 1 and 2).

Further, the sheet discharge part 16 is provided with a sheet pressing part 80 that presses a sheet toward the sheet discharge tray 72. The sheet discharged into the sheet discharge part 16 is properly pulled toward the sheet discharge tray 72 due to the inclination of the rear-end support part 74 and the pressure of the sheet pressing part 80.

As illustrated in FIG. 1 to FIG. 4, a display panel 48 having the shape of substantially a rectangular flat plate and forming the upper wall of the casing 12 is provided at the top of the casing 12. According to the first embodiment, the display panel 48 is a sensor-incorporated liquid crystal panel in which an optical sensor is incorporated in each pixel of the liquid crystal panel, and it includes a plurality of pixels arranged in a matrix and an optical sensor 58 (see FIG. 5) provided in each pixel. The display panel 48 has, in addition to the image display function for displaying an image, the image reading function for reading an image and the touch detection function for detecting the position pointed (touched) by the user. For example, the area on the front right side of the display panel 48 is used as an operating part 48a, and the area other than the operating part 48a is used as an image read part 48b. The operating part 48a displays a software key (icon) and a message for receiving various settings or printing instructions from the user. For example, the operating part 48a displays a home screen that is a screen for selecting the desired job from various jobs executable by the image forming apparatus 10. However, according to the first embodiment, the job means copying (including scanning of a document), printing, fax sending, and the like.

As the specific configuration of the display panel 48 having the image reading function and the touch detection function is disclosed in Japanese Patent Application Laid-Open No. 2010-62940 by the present applicant, it is to be referred to. The use of the display panel 48 makes the apparatus thin and improves the convenience and the aesthetics of the image forming apparatus 10. However, the specific configuration of the display panel 48 is alterable as appropriate.

Figure 5:
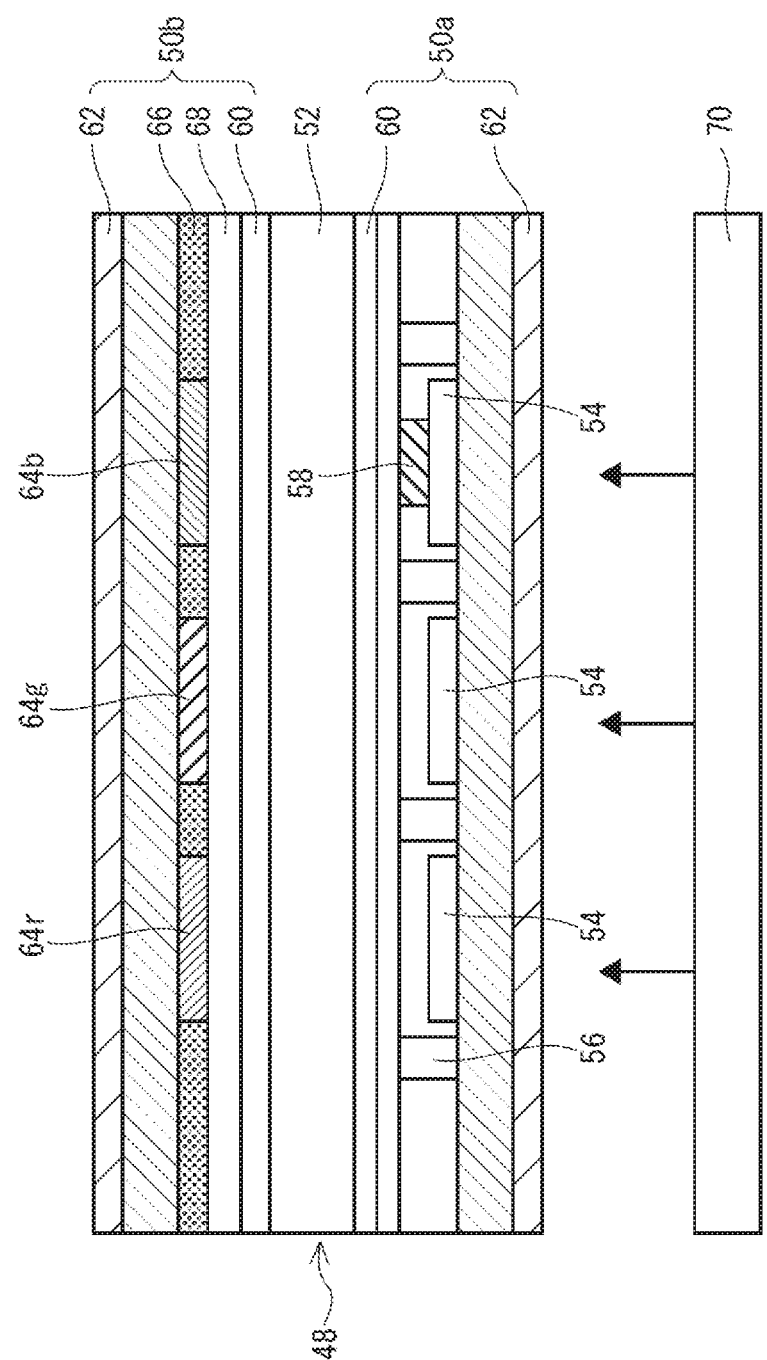
FIG. 5 is an illustrative view that schematically illustrates a cross-sectional structure of a display panel included in the image forming apparatus of FIG. 1.
Figure 6A:
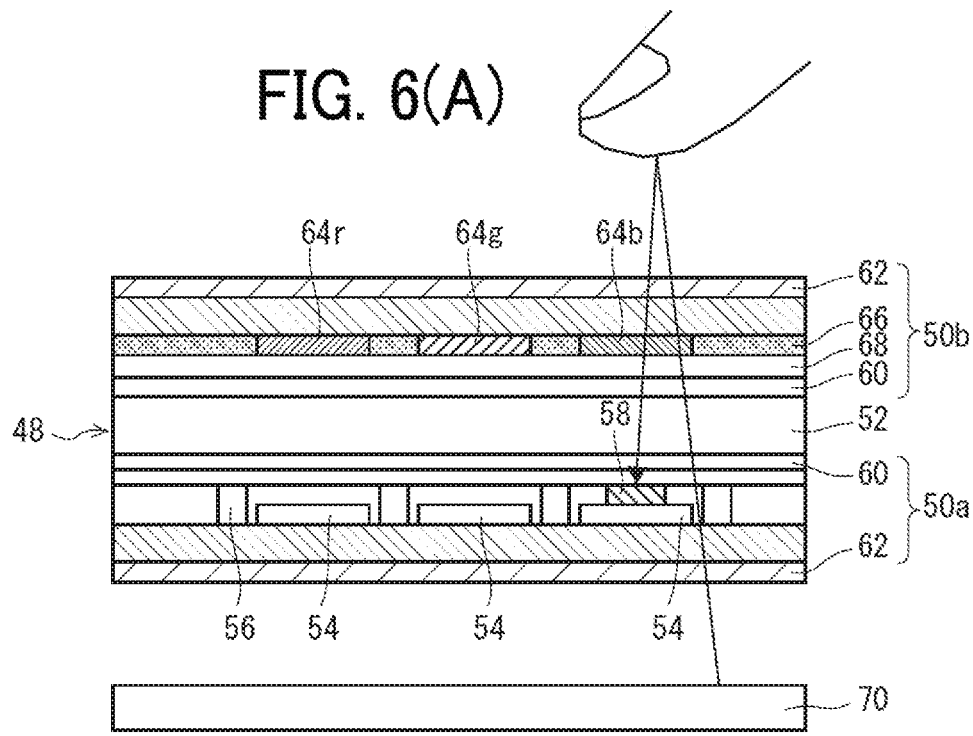
FIG. 6(A) is an illustrative view that illustrates a method of detecting a touch position by using a reflected image.
Figure 6B:
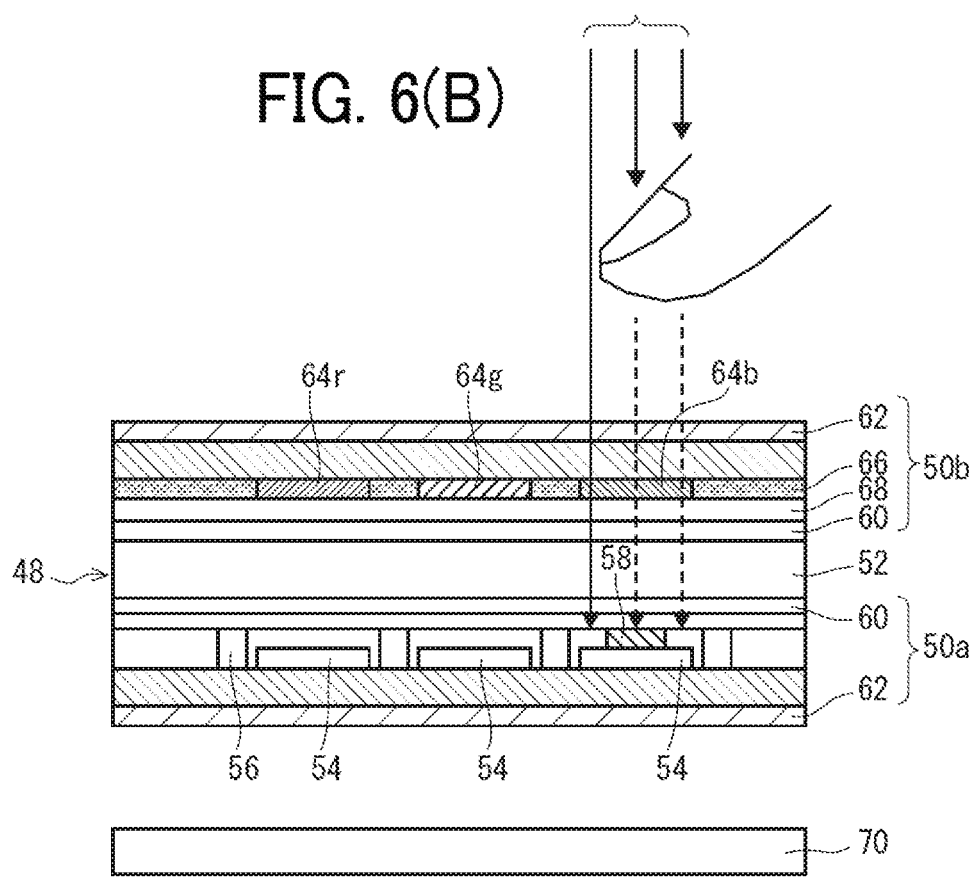
FIG. 6(B) is an illustrative view that illustrates a method of detecting a touch position by using a shadow image.

FIG. 5 is an illustrative view that schematically illustrates a cross-sectional structure of the display panel included in the image forming apparatus 10 of FIG. 1. FIG. 6(A) is an illustrative view that illustrates a method of detecting a touch position by a reflected image. FIG. 6(B) is an illustrative view that illustrates a method of detecting a touch position by a shadow image.

A brief description is given with reference to FIG. 5; the display panel 48 includes an active matrix substrate 50a disposed on the back side and an opposing substrate 50b disposed on the front side and has a liquid crystal layer 52 interposed between these substrates. A pixel electrode 54, a data signal line 56, the optical sensor 58, an oriented film 60, a polarizing plate 62, and the like, are provided on the active matrix substrate 50a. Color filters 64r (red), 64g (green), 64b (blue), a light shielding film 66, an opposite electrode 68, the oriented film 60, the polarizing plate 62, and the like, are provided on the opposing substrate 50b. Further, a backlight (light emitting part) 70 is provided on the back side of the display panel 48.

In the display panel 48, when a document is placed on the polarizing plate 62 of the active matrix substrate 50a, light is emitted from the backlight 70. The light from the backlight 70 is reflected by the document on the polarizing plate 62, and the reflected light is detected by the optical sensor 58 via the color filters 64r, 64g, and 64b so that the image on the document is read.

Furthermore, the display panel 48 is capable of detecting the position of the polarizing plate 62 that is touched by the user's fingertip, or the like. For example, the display panel 48 detects the reflected image of the user's fingertip, or the like, with the optical sensor 58, thereby detecting the position (touch position) touched by the user. Specifically, as illustrated in FIG. 6(A), the light emitted from the backlight 70 is reflected by an object such as a finger of the user. The reflected light, reflected by the object, enters the optical sensor 58. At this time, the level of the sensor output signal output from the optical sensor 58 fluctuates. It is determined that an object is present when the level of the sensor output signal is more than a predetermined value (threshold). Then, the touch position is detected in accordance with the position of the pixel at which the object is detected.

Furthermore, the display panel 48 is capable of detecting the position touched by the user by detecting a shadow image with the optical sensor 58. The optical sensor 58 included in the display panel 48 is capable of detecting external light transmitted through the opposing substrate 50b, or the like. As illustrated in FIG. 6(B), when there is an object such as the user's finger, the incident external light is interrupted, and the amount of external light incident on the optical sensor 58 is reduced. As a result, the level of the sensor output signal output from the optical sensor 58 fluctuates so that it is determined that an object is present.

Figure 7:
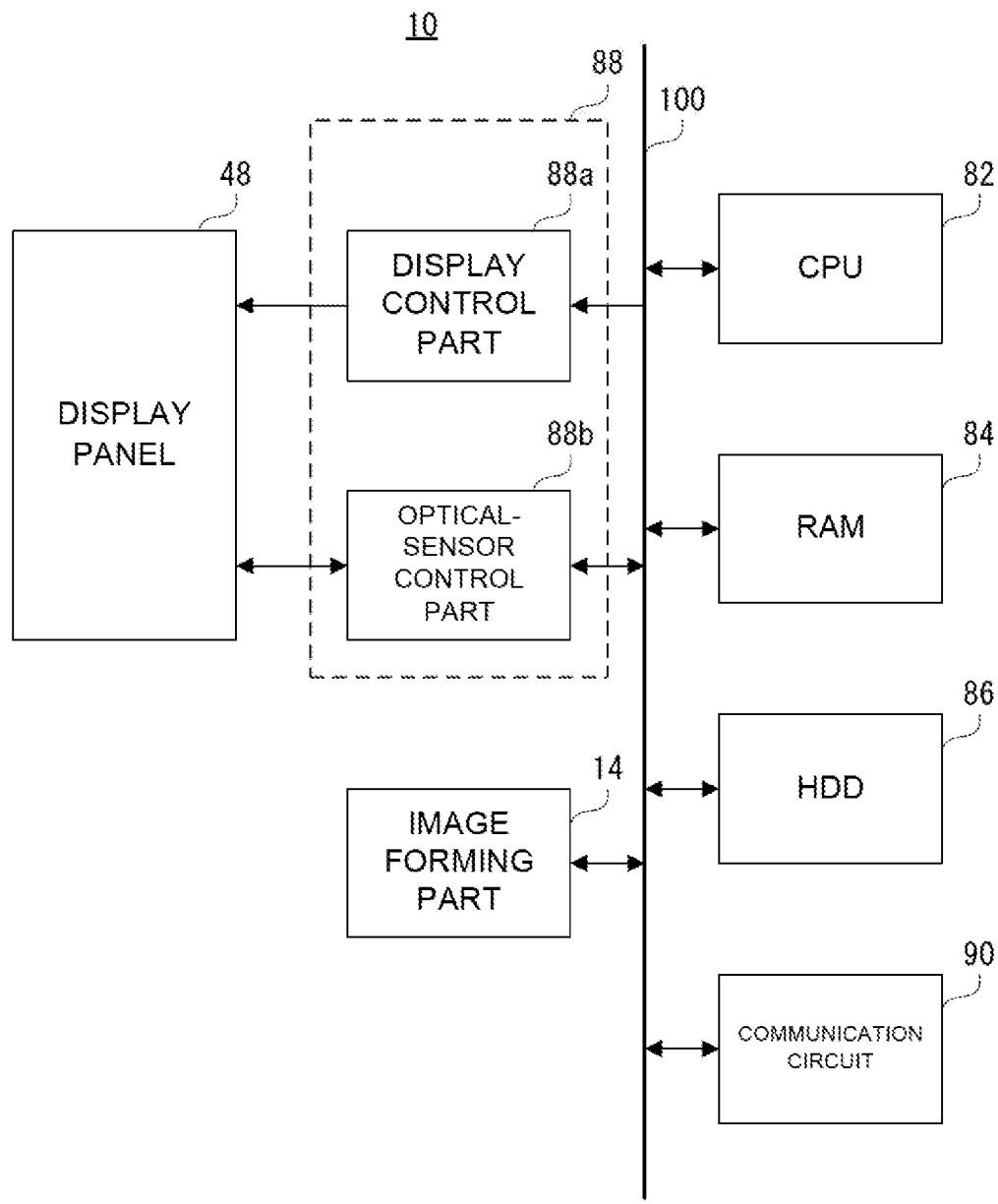
FIG. 7 is a block diagram that illustrates an electrical configuration of the image forming apparatus illustrated in FIG. 1.

FIG. 7 is a block diagram that illustrates an electrical configuration of the image forming apparatus 10 illustrated in FIG. 1. With reference to FIG. 7, the image forming apparatus 10 includes a CPU 82. The CPU 82 is connected, via a bus 100, to a RAM 84, an HDD 86, a display-panel control circuit 88, the communication circuit 90, and the image forming part 14. Further, the display panel 48 is connected to the display-panel control circuit 88.

The CPU 82 performs the overall control on the image forming apparatus 10. The RAM 84 is used as a work area and a buffer area of the CPU 82.

The HDD 86 is the primary storage device of the image forming apparatus 10 and appropriately stores a control program, data, and the like, for the CPU 82 to control the operation of each part of the image forming apparatus 10. Furthermore, the HDD 86 stores a print job including image data transmitted from an external computer. However, instead of the HDD 86 or in addition to the HDD 86, a different non-volatile memory such as a flash memory may be provided.

The display-panel control circuit 88 includes a display control part 88a and an optical-sensor control part 88b. The display control part 88a includes a GPU, a VRAM, etc. The GPU generates, in the VRAM, display image data for displaying various screens on the display panel 48 by using image generation data 304c (see FIG. 9) stored in the RAM 84 in accordance with the instruction of the CPU 82 and outputs the generated display image data to the display panel 48.

The optical-sensor control part 88b transmits a timing control signal to an optical-sensor driving circuit (not illustrated) of the optical sensor 58 in accordance with the instruction of the CPU 82 and causes the display panel 48 to execute scanning.

Further, the optical-sensor control part 88b acquires a sensor output signal output from the optical sensor 58. The sensor output signal acquired by the optical-sensor control part 88b is input to the CPU 82. The CPU 82 generates the image data corresponding to the acquired sensor output signal when the scanner function (document reading) is executed in accordance with the user's instruction. That is, the image data read by the display panel 48 is generated. Moreover, when the display panel 48 is touched by the user's fingertip, or the like, the CPU 82 generates coordinate data indicating the position on the display panel 48 in accordance with the acquired sensor output signal. That is, touch coordinate data corresponding to the position on the display panel 48 touched by the user is generated.

The communication circuit 90 is a circuit for connecting to a network such as a LAN or the Internet. The communication circuit 90 is a wired communication circuit or a wireless communication circuit and, in accordance with an instruction from the CPU 82, communicates with an external computer via the network. However, the communication circuit 90 is capable of directly communicating with an external computer by near field communication, or the like, without passing through a network.

Furthermore, the electrical configuration of the image forming apparatus 10 illustrated in FIG. 7 is merely an example, and there is no need to impose a limitation on this.

In conventional image forming apparatuses, it is difficult for a user to check whether the printed material, discharged to the sheet discharge part, has been printed in response to the print job requested by him/herself. When the user does not check the content of the printed material, the printed material of a different user may be mistakenly collected.

If the user picks up the printed material discharged to the sheet discharge part and checks the content thereof, it is possible to prevent the other user's printed material from being mistakenly collected; however, this is time-consuming and inconvenient.

Therefore, with the image forming apparatus 10 according to the first embodiment, when a predetermined condition is satisfied, a preview image 110 corresponding to the image data for printing an image on the sheet is displayed on the display panel 48.

Figure 8:
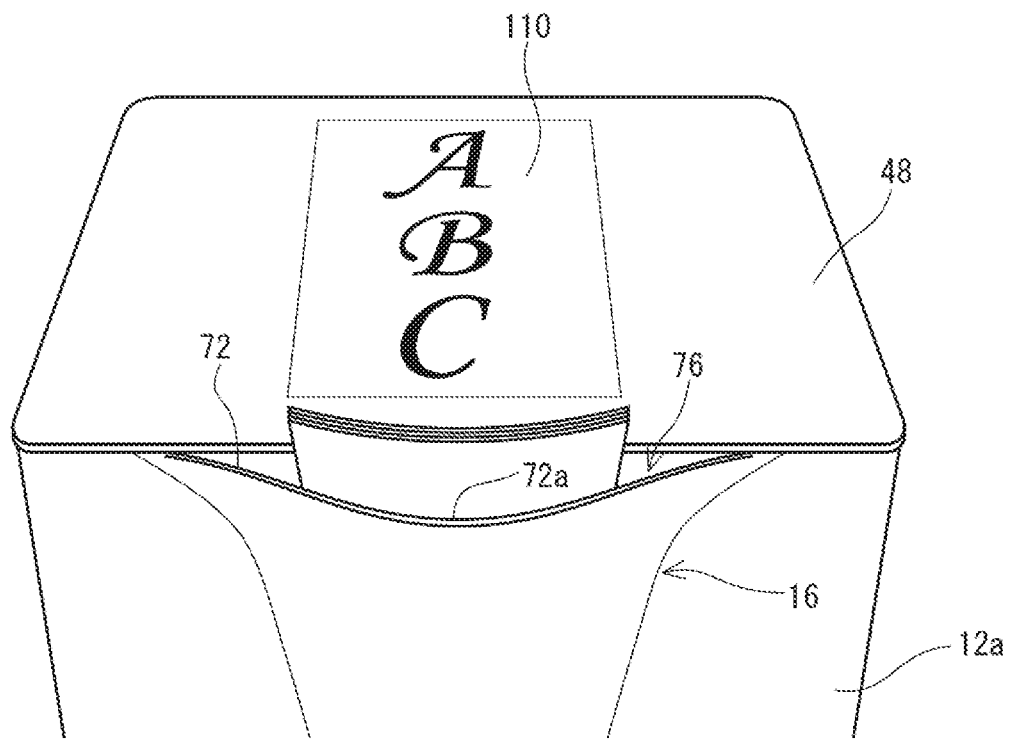
FIG. 8 is a perspective view that illustrates the display panel in a state where a preview image is displayed.

FIG. 8 is a perspective view that illustrates the display panel 48 in a state where the preview image 110 is displayed.

As illustrated in FIG. 8, when a predetermined condition is satisfied, the display panel 48 displays the preview image 110. According to the first embodiment, the predetermined condition is satisfied in response to the printing of an image on the sheet by the image forming part 14. Therefore, when an image is printed on a sheet in the image forming part 14, the display panel 48 displays the preview image 110. The time when an image is printed on a sheet in the image forming part 14 means the time when a print job is being executed. Specifically, the time when an image is printed on a sheet in the image forming part 14 means the time from when a print job is started until when the last sheet (final sheet) in the print job is discharged to the sheet discharge part 16. Here, the time when a print job is started means the time when the first sheet in the print job is fed or the time when the CPU 82 outputs a signal to the image forming part 14 so as to start printing.

Then, while the print job is executed, the preview image 110 is displayed on the display panel 48 at a predetermined timing. For example, when the print job is started, the preview image 110 is displayed on the display panel 48. Here, the print job is started when, for example, the image forming apparatus 10 receives image data transmitted from the external computer.

The preview image 110 is displayed at the center of the display panel 48 in the front, back, left, and right directions. The vertical (up-and-down) direction of the preview image 110 is the same as the front-and-back direction of the display panel 48 (the image forming apparatus 10). Furthermore, the left-and-right direction of the preview image 110 is the same as the left-and-right direction of the display panel 48. Further, the orientation of the preview image 110 is such that the upper side of the preview image 110 is positioned on the back surface side of the display panel 48 (the lower side of the preview image 110 is positioned on the front surface side of the display panel 48). That is, the preview image 110 is displayed by being orientated so as to be viewed from the front surface side (the front of the image forming apparatus 10). The same holds for the case where the orientation of the image corresponding to the preview image 110 is a portrait orientation or a landscape orientation.

The size of the preview image 110 is the same (the same magnification) as the size of the image printed on the sheet. However, the size of the preview image 110 may be larger than the size of the image printed on the sheet or may be smaller than the size of the image printed on the sheet.

Furthermore, when images are printed on multiple sheets (when the print job has multiple pages), the image printed on the first sheet (the image on the first page) is used as the preview image 110. However, when the print job has multiple pages, multiple images may be sequentially displayed as the preview image 110, starting from the image on the first page. Moreover, when the print job has multiple pages, the images on all the pages may be displayed at once as the preview image 110. In this case, the size of each image is sometimes reduced so that the images on all the pages are fitted into the display area of the display panel 48.

Then, according to the first embodiment, the preview image 110 is hidden when the print job ends. Here, the time when the print job ends means the time when the final sheet in the print job is discharged to the sheet discharge part 16.

The above-described operation of the image forming apparatus 10 is performed when the CPU 82 executes a control program stored in the RAM 84. The specific process is described later by using a flowchart.

Figure 9:
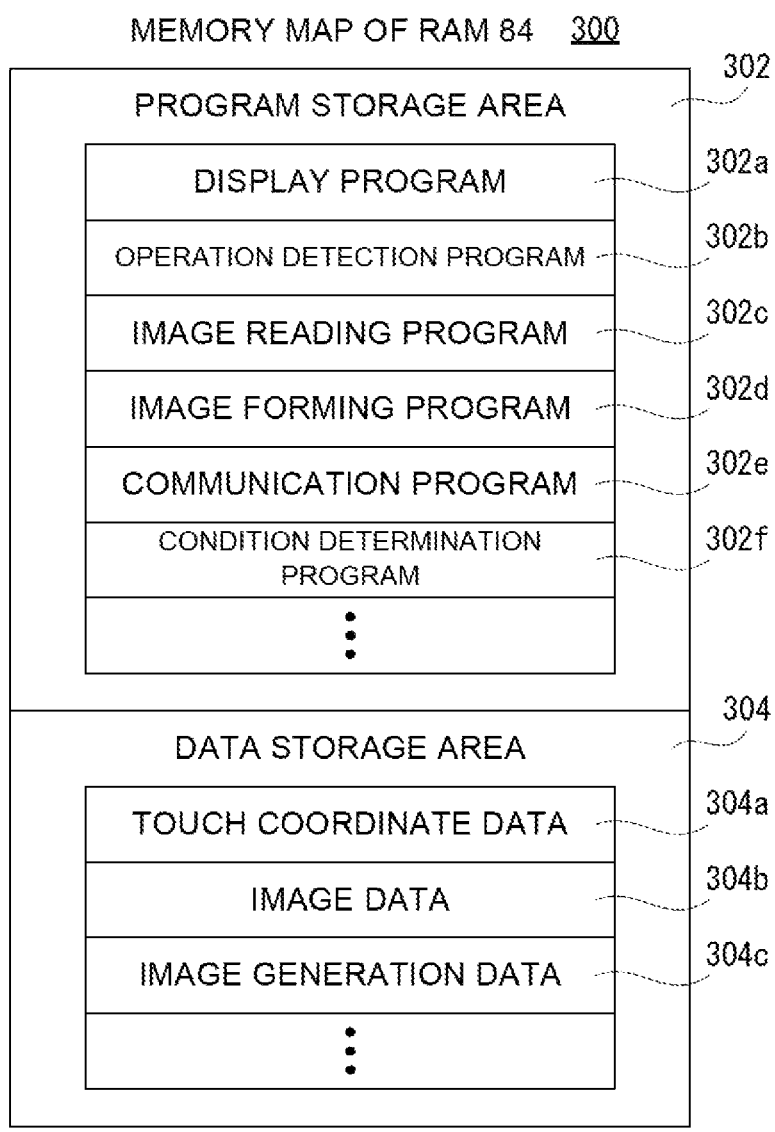
FIG. 9 is an illustrative view that illustrates an example of a memory map of a RAM illustrated in FIG. 7.

FIG. 9 is an illustrative view that illustrates an example of a memory map 300 of the RAM 84 illustrated in FIG. 7. As illustrated in FIG. 9, the RAM 84 includes a program storage area 302 and a data storage area 304. In the program storage area 302 of the RAM 84, as described above, the control program of the image forming apparatus 10 is stored. The control program includes a display program 302a, an operation detection program 302b, an image reading program 302c, an image forming program 302d, a communication program 302e, and a condition determination program 302f.

The display program 302a is a program for controlling the display control part 88a to cause the display panel 48 to display the preview image 110 corresponding to image data 304b described later. Furthermore, the display program 302a is also a program for controlling the display control part 88a to cause the display panel 48 to display the operating part 48a including various screens such as a home screen or a setting screen. Moreover, the display program 302a is also a program for controlling the display control part 88a to cause the display panel 48 to display the preview image corresponding to the image data 304b when the condition determination program 302f described later determines that a predetermined condition is satisfied.

The operation detection program 302b is a program for detecting a touch operation on the display panel 48. For example, the operation detection program 302b is a program for acquiring touch coordinate data output from the optical-sensor control part 88b and detecting that various icons included in various screens, such as a home screen, displayed on the operating part 48a have been operated.

The image reading program 302c is a program for reading an image on a document and outputting an image signal (image data) corresponding to the read image.

The image forming program 302d is a program for controlling the image forming part 14 to print a multi-color or single-color image corresponding to the image data 304b on a sheet.

The communication program 302e is a program for communicating with an external computer, or the like, via a network.

The condition determination program 302f is a program for determining whether a predetermined condition is satisfied.

Furthermore, although not illustrated, the program storage area 302 also stores, for example, programs for selecting and executing various functions.

In the data storage area 304 of the RAM 84, touch coordinate data 304a, the image data 304b, the image generation data 304c, and the like, are stored.

The touch coordinate data 304a is touch coordinate data detected (acquired) in accordance with the operation detection program 302b. The detected touch coordinate data 304a is stored in chronological order.

The image data 304b is image data, or the like, input from an external computer. Further, the image data 304b may be image data read by the image read part 48b (the display panel 48).

The image generation data 304c is data such as polygon data or texture data for generating display image data corresponding to various screens to be displayed on the display panel 48. Furthermore, the image generation data 304c includes operation screen data corresponding to the operating part 48a, preview image data corresponding to the image data 304b, and the like.

Although not illustrated, in the data storage area 304, other data sets necessary for executing a control program is stored, or a register necessary for executing a control program is provided.

Figure 10:
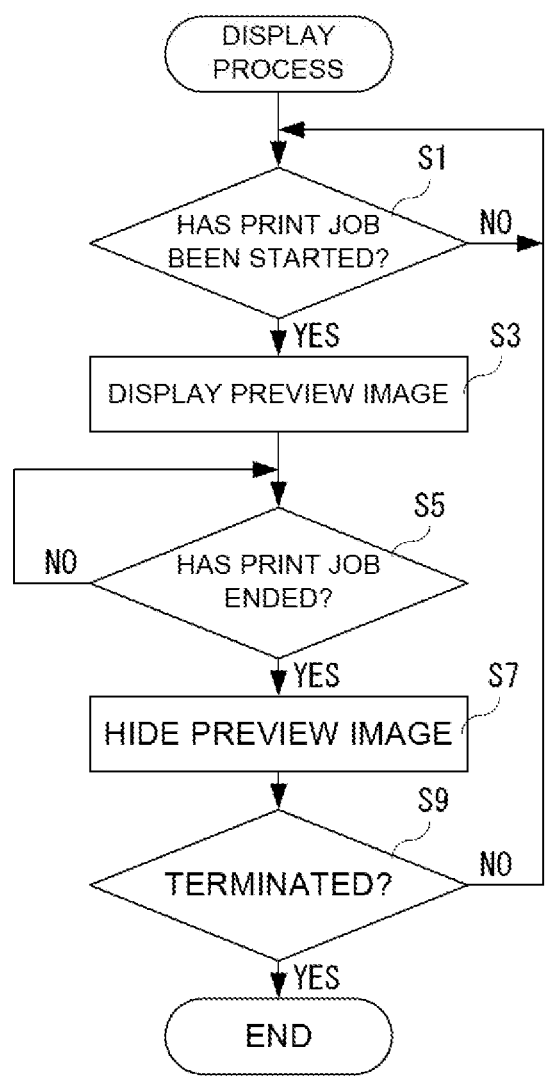
FIG. 10 is a flowchart that illustrates an example of a display process of the image forming apparatus illustrated in FIG. 1.

FIG. 10 is a flowchart that illustrates an example of a display process of the image forming apparatus 10 illustrated in FIG. 1. The display process starts when the power of the image forming apparatus 10 is turned on or is restored from the standby state (power saving mode). As illustrated in FIG. 10, when the display process starts, the CPU 82 determines whether a print job has been started at Step S1. When "NO" at Step S1, that is, when the print job has not been started, a return is made to Step S1. Conversely, when "YES" at Step S1, that is, when the print job has been started, the preview image 110 is displayed on the display panel 48 at Step S3.

At the following Step S5, it is determined whether the print job has ended. When "NO" at Step S5, that is, when the print job is being executed, a return is made to the same Step S5. Conversely, when "YES" at Step S5, that is, when the print job has ended, the preview image 110 is hidden at Step S7, and it is determined at Step S9 whether the display process is to be terminated. The display process is terminated when, for example, the power of the image forming apparatus 10 is turned off or when the image forming apparatus 10 shifts to the power saving mode.

When "NO" at Step S9, that is, the display process is not to be terminated, a return is made to Step S1. Conversely, when "YES" at Step S9, the display process is terminated.

According to the first embodiment, as the preview image 110 corresponding to the image data 304b for printing the image on the sheet is displayed on the display panel 48, it is easy for the person near the image forming apparatus to check the content of the printed material. Furthermore, according to the first embodiment, it is possible to avoid taking the wrong printed material.

Furthermore, according to the first embodiment, as the preview image 110 is displayed on the display panel 48 when the print job is executed, it is easy for the person near the image forming apparatus to check the content of the printed material that is in the process of printing, and it is possible to avoid taking the wrong printed material.

Although the preview image 110 is displayed until the last sheet in the print job is discharged to the sheet discharge part 16 according to the first embodiment, there is no need to impose a limitation on this. The preview image 110 may be displayed on the display panel 48 even after the last sheet in the print job is discharged to the sheet discharge part 16. For example, the preview image 110 may be displayed on the display panel 48 until a predetermined time has elapsed after the last sheet in the print job is discharged to the sheet discharge part 16. Thus, even when the user comes to collect the printed material after the print job ends, it is easy for the user to check the content of the printed material, and it is possible to avoid taking the wrong printed material.

Figure 11:
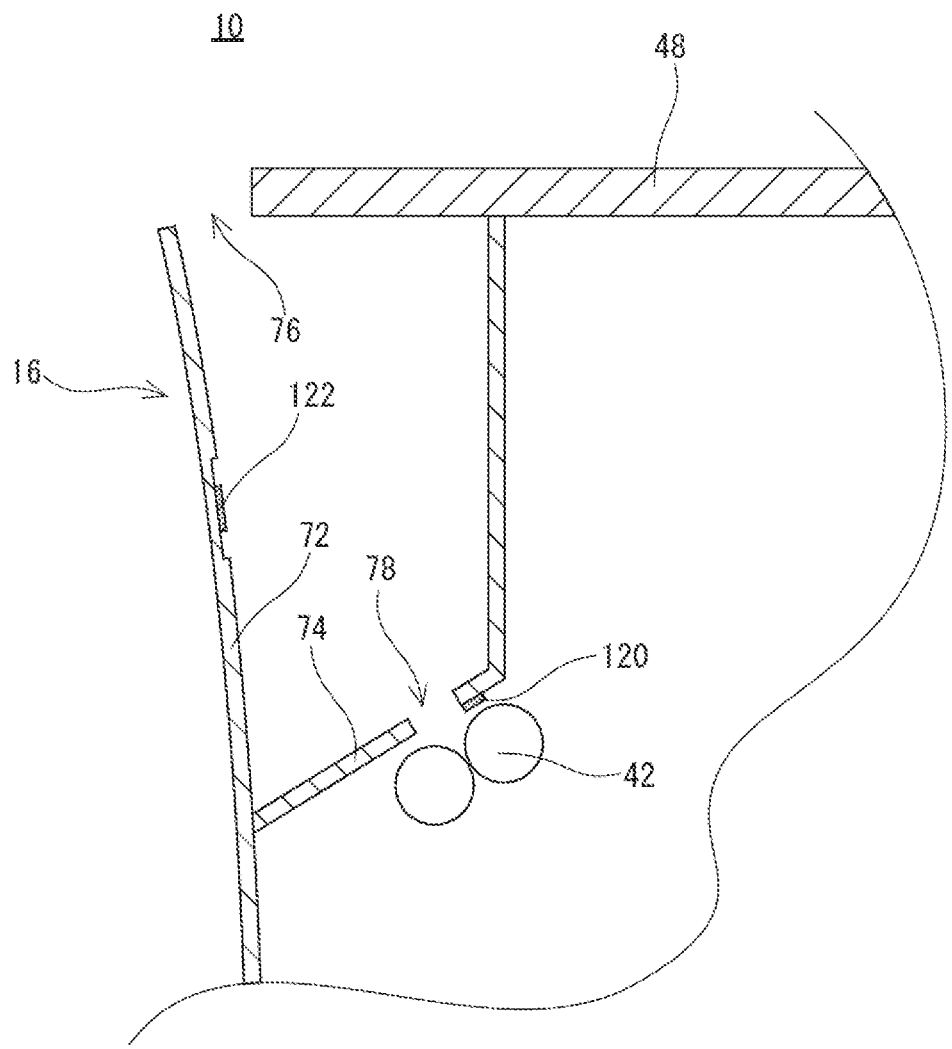
FIG. 11 is a schematic cross-sectional view that illustrates a sheet discharge part according to a modification.

FIG. 11 is a schematic cross-sectional view that illustrates the sheet discharge part according to a modification. As illustrated in FIG. 11, the sheet discharge part 16 may be provided with a first sheet discharge sensor 120 and a second sheet discharge sensor 122. The first sheet discharge sensor 120 is provided on the lower surface of the rear-end support part 74 to detect the presence or absence of a sheet passing through the sheet discharge roller 42 (the sheet discharge port 78). The second sheet discharge sensor 122 is provided on the inner surface side of the sheet discharge tray 72 (the front wall 12a of the casing 12) to detect the presence or absence of the sheet discharged to the sheet discharge part 16 (the sheet discharge tray 72). A general-purpose optical sensor may be used as the first sheet discharge sensor 120 and the second sheet discharge sensor 122. Furthermore, a contact-type sensor including an actuator and a photo sensor may be used as the first sheet discharge sensor 120 and the second sheet discharge sensor 122. For example, when a reflective optical sensor is used as the first sheet discharge sensor 120 and the second sheet discharge sensor 122, the first sheet discharge sensor 120 and the second sheet discharge sensor 122 include a light emitting part and a light receiving part. When no sheet is present at the positions of the first sheet discharge sensor 120 and the second sheet discharge sensor 122, light output from the light emitting part is not reflected, and no reflected light enters the light receiving part. In this case, the first sheet discharge sensor 120 and the second sheet discharge sensor 122 output data indicating that no reflected light is incident. Conversely, when a sheet is present at the positions of the first sheet discharge sensor 120 and the second sheet discharge sensor 122, light output from the light emitting part is reflected by the sheet, and the reflected light enters the light receiving part. In this case, the first sheet discharge sensor 120 and the second sheet discharge sensor 122 output data indicating that the reflected light is incident. The CPU 82 determines the presence or absence of the sheet passing through the sheet discharge roller 42 based on the output of the first sheet discharge sensor 120. Furthermore, the CPU 82 determines the presence or absence of the sheet discharged to the sheet discharge part 16 based on the output of the second sheet discharge sensor 122.

With the image forming apparatus 10 having the above configuration, a predetermined condition may be satisfied in response to the discharge of the printed sheet to the sheet discharge part 16. In this case, the preview image 110 may be displayed on the display panel 48 when the printed sheet is discharged to the sheet discharge part 16. Here, the time when the sheet is discharged to the sheet discharge part 16 means, specifically, the time when the front end or the rear end of the first sheet in the print job is detected by the first sheet discharge sensor 120. In this way, it is easy for the user to check the content of the printed material discharged to the sheet discharge part 16, and it is possible to avoid taking the wrong printed material.

Furthermore, it is possible that the predetermined condition ceases to be satisfied in response to the pullout of the sheet from the sheet discharge part 16. In this case, the preview image 110 is displayed on the display panel 48 until the sheet is pulled out of the sheet discharge part 16, and it is hidden when the sheet is pulled out from the sheet discharge part 16. Here, the time when the sheet is pulled out from the sheet discharge part 16 means the time when the second sheet discharge sensor 122 does not detect the sheet. In this way, it is easy for the user to check the content of the printed material even when it takes a long time to collect the printed material after the print job ends, and it is possible to avoid taking the wrong printed material.

Furthermore, although the preview image 110 is displayed at the center of the display panel 48 in the front, back, left, and right directions according to the first embodiment, there is no need to impose a limitation on this. For example, the preview image 110 may be displayed on the front side of the display panel 48. In this way, as the preview image 110 is displayed at a position close to a person present near the image forming apparatus 10, the person present near the image forming apparatus 10 easily recognizes the preview image. Furthermore, the preview image 110 may be displayed at a position different from the operating part 48a. For example, when the operating part 48a is disposed in the area on the front right side of the display panel 48, the preview image 110 is displayed on the left side area. In this manner, it is possible to prevent the preview image 110 and the operating part 48a from being overlapped with each other. This prevents the preview image 110 from being difficult to be visually recognized due to the operating part 48a and prevents the operating part 48a from being difficult to be operated due to the preview image 110.

Second Embodiment

According to the first embodiment, the predetermined condition is satisfied in response to the printing of an image on a sheet in the image forming part 14.

On the other hand, according to the second embodiment, the predetermined condition is satisfied in response to the presence of a person near the image forming apparatus 10 in addition to the printing of the image on the sheet in the image forming part 14.

Figure 12:
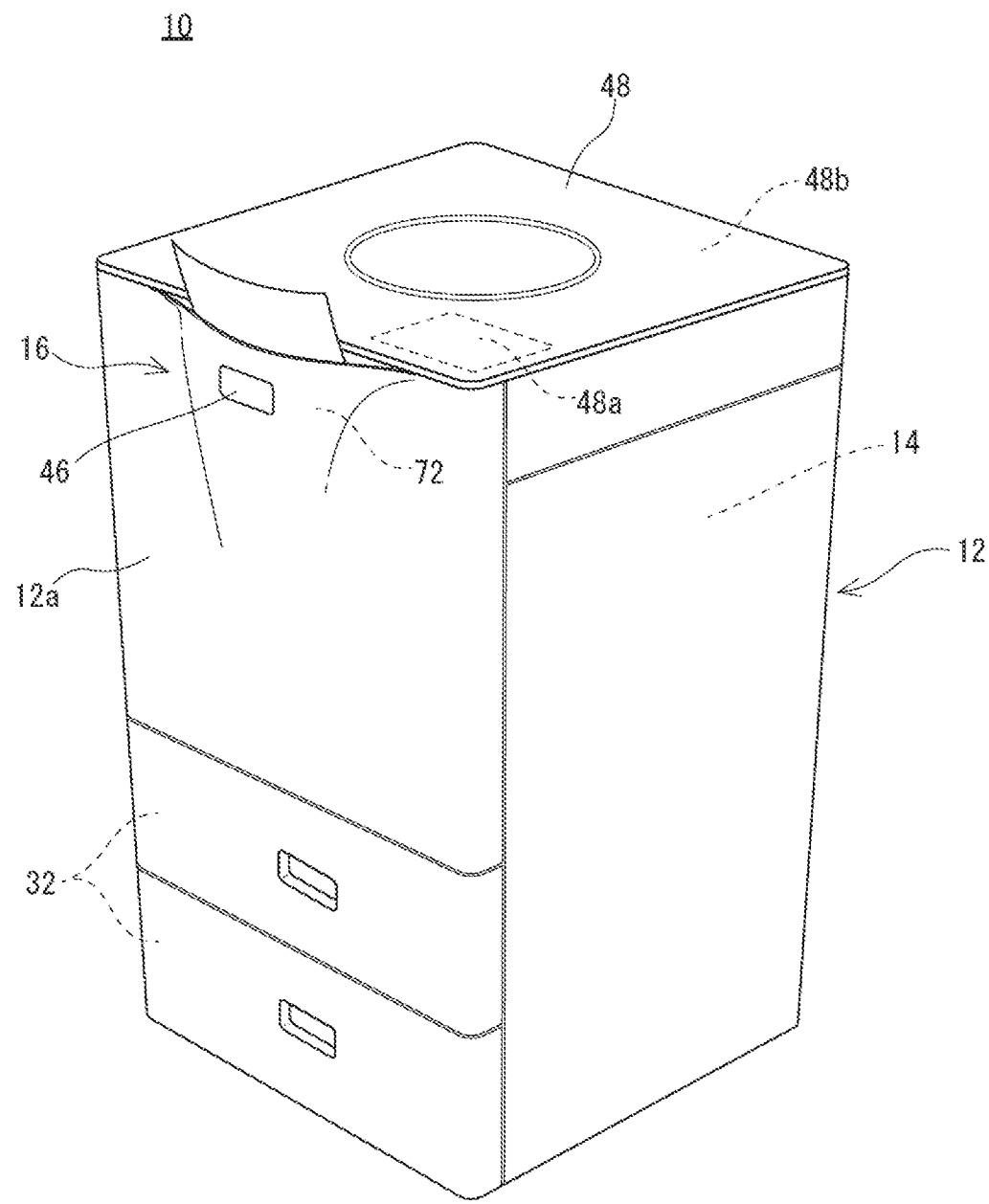
FIG. 12 is an illustrative view that illustrates an external appearance of an image forming apparatus according to a second embodiment.
Figure 13:
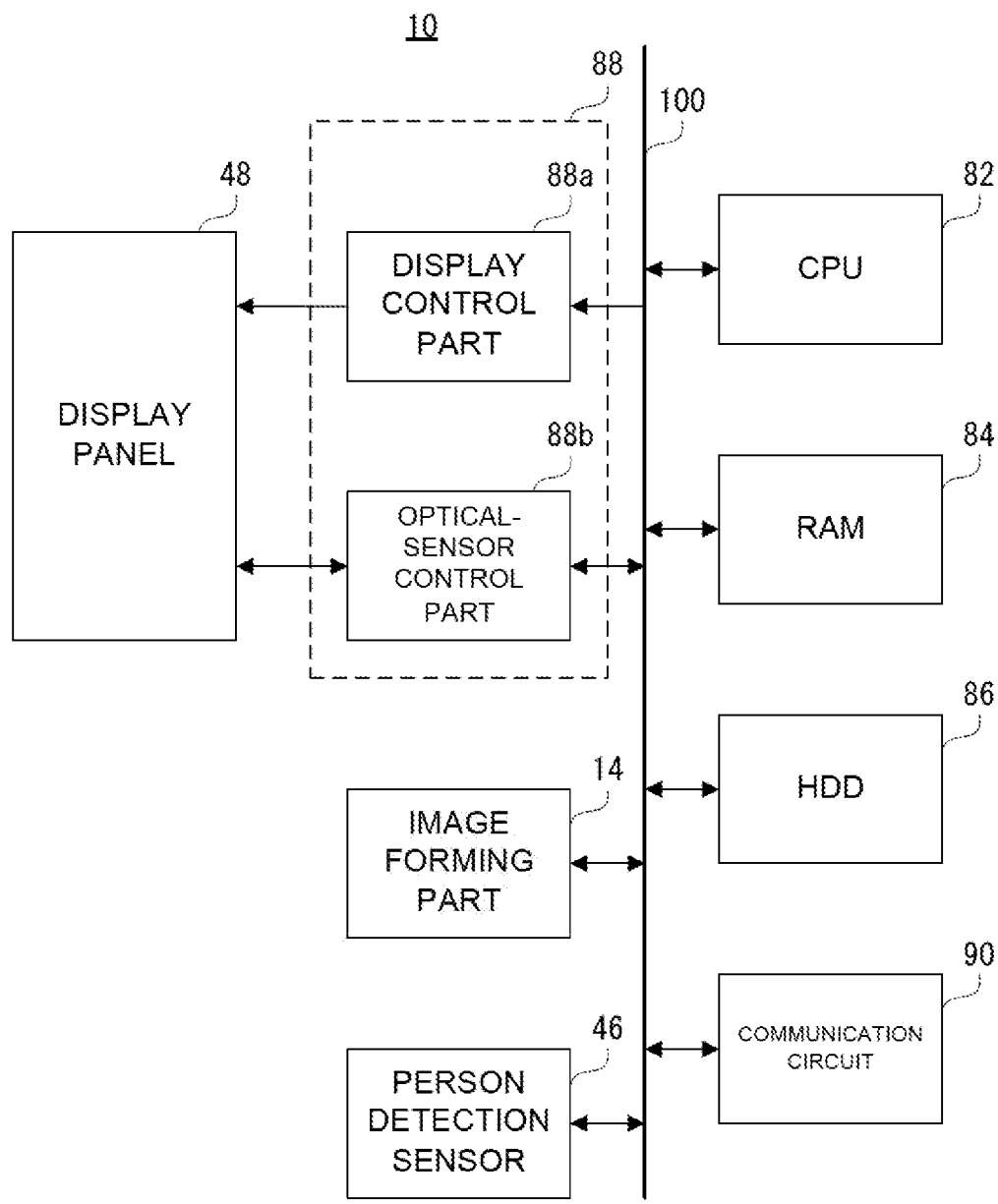
FIG. 13 is a block diagram that illustrates an electrical configuration of the image forming apparatus according to the second embodiment.

FIG. 12 is an illustrative view that illustrates an external appearance of the image forming apparatus according to the second embodiment. FIG. 13 is a block diagram that illustrates an electrical configuration of the image forming apparatus 10 according to the second embodiment. As illustrated in FIG. 12 and FIG. 13, the image forming apparatus 10 according to the second embodiment includes a person detection sensor 46. The person detection sensor 46 is provided on the front wall 12a of the casing 12. The person detection sensor 46 is a distance sensor for detecting a person present in a predetermined area (a person present near the image forming apparatus 10) in front of the image forming apparatus 10 and, for example, an infrared sensor, an ultrasonic sensor, a laser distance sensor, etc., is used. According to the first embodiment, a control part 44 detects whether a person is present in the predetermined range in front of the image forming apparatus 10 based on the distance data detected by the person detection sensor 46.

The person detection sensor 46 is connected to the CPU 82 via the bus 100 to output distance data to the CPU 82. The CPU 82 determines whether a person (user) is present in front of (before) the image forming apparatus 10 depending on whether the distance indicated by the distance data output from the person detection sensor 46 falls within the predetermined distance that defines a first range A. Therefore, it can be said that the first range A is a range set to determine whether a person is present in front of the image forming apparatus 10.

Figure 14:
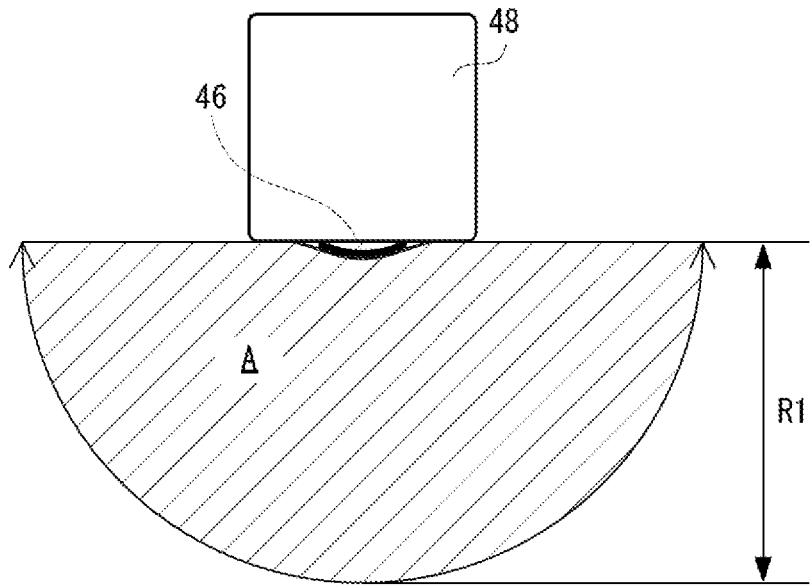
FIG. 14 is a plan view that illustrates a first range A that is set around the image forming apparatus.
Figure 15:
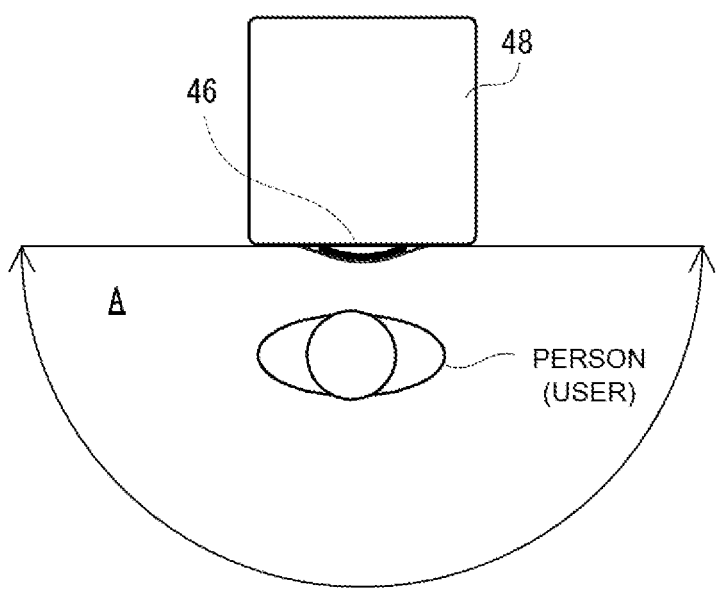
FIG. 15 is a plan view that illustrates a case where a person is present in the first range A.

FIG. 14 is a plan view that illustrates the first range A that is set around the image forming apparatus 10. FIG. 15 is a plan view that illustrates a case where a person is present in the first range A.

The first range A is a range in which it is considered that there is a person who may use (operate) the image forming apparatus 10. That is, it is a range near the image forming apparatus 10. As illustrated in FIG. 14, the first range A is defined by, for example, a semicircle having a radius that is a first distance R1. Here, the first distance R1 is the distance in the horizontal direction from the center of the front surface of the image forming apparatus 10 and, according to the first embodiment, it is set to be more than the length from the center of the front surface of the image forming apparatus 10 to both edges in the left-right direction. That is, according to the first embodiment, the first range A is set to be a range on the front surface side (the front side) of the image forming apparatus 10 and in which a person present at the position to operate the image forming apparatus 10 (e.g., the position to reach the display panel 48) is detectable.

Furthermore, the size and the shape of the first range A is changeable as appropriate. For example, it may be set to be a range in which a person present at the position to be able to view the display panel 48 is detectable. Although detailed description is omitted, the number of the person detection sensors 46 does not need to be limited to one, and it may be two or more as long as it is possible to detect a person present in the set first range A.

Furthermore, the detectable range of the person detection sensor 46 may include the first range A and does not need to coincide with the first range A. Further, when there is a fixed obstacle in the first range A, the obstacle may be excluded from a detection result in advance.

As illustrated in FIG. 15, when a person is present in the first range A, the person detection sensor 46 outputs, to the CPU 82, the distance data corresponding to a distance shorter than the first distance R1. The CPU 82 determines that a person is present in the first range A when the distance data on the distance shorter than the first distance R1 is received (acquired). Furthermore, when there is no person in the first range A, the person detection sensor 46 outputs, to the CPU 82, the distance data corresponding to a distance longer than the first distance R1. The CPU 82 determines that there is no person in the first range A when the distance data on the distance longer than the first distance R1 is received.

Although detailed description is omitted, the CPU 82 determines that a person is present in the first range A when the distance data on the distance equal to the first distance R1 is received according to the first embodiment. However, in this case, the CPU 82 may determine that there is no person in the first range A.

Further, although detailed description is omitted, the CPU 82 determines that a person has entered the first range A from outside the first range A when the distance data corresponding to a distance longer than the first distance R1 is received and then the distance data corresponding to a distance shorter than the first distance R1 is received. That is, it is determined that there is a person near the image forming apparatus 10.

Conversely, the CPU 82 determines that a person has moved from inside the first range A to outside the first range A when the distance data corresponding to a distance shorter than the first distance R1 is received and then the distance data corresponding to a distance longer than the first distance R1 is received. That is, it is determined that there is a person moving away from the image forming apparatus 10.

Furthermore, as the person detection sensor 46, a pyroelectric sensor, a floor sensor (pressure sensor), or the like, may be used instead of the distance sensor. When a pyroelectric sensor is used, the pyroelectric sensor detects a temperature change in the first range A, and the CPU 82 determines whether a person is present in the first range A in accordance with the output of the pyroelectric sensor. Furthermore, when a floor sensor is used, the floor sensor is provided in the range of the floor surface corresponding to the first range A of the image forming apparatus 10, and the CPU 82 determines whether a person is present in the first range A in accordance with the output of the floor sensor.

Moreover, a camera (image sensor) may be used as the person detection sensor 46 instead of the distance sensor. In this case, a predetermined area in front of the image forming apparatus 10 is captured by the camera so that the presence or absence of a person is detectable from the captured image.

According to the second embodiment, the predetermined condition is satisfied in response to the determination that a person is present in the first range A in addition to the printing of the image on the sheet in the image forming part 14. That is, according to the second embodiment, the preview image 110 is displayed on the display panel 48 when the print job is being executed and it is determined that a person is present in the first range A. Further, the predetermined condition ceases to be satisfied in response to the determination that no person is present in the first range A even when the print job is being executed.

Therefore, according to the second embodiment, the preview image 110 is not displayed when there is no person in the first range A, which is set around the image forming apparatus 10, even when the print job is being executed. Moreover, when there is no person in the first range A, which is set around the image forming apparatus 10, the backlight 70 is turned off (off) and the display panel 48 enters the light-off state (hidden state).

For example, if there is a person in the first range A when a print job is started, the preview image 110 is displayed on the display panel 48 simultaneously with the start of the print job.

Furthermore, in a case where there is no person in the first range A when a print job is started and a person enters the first range A (approaches the image forming apparatus 10) after the print job is started, the preview image 110 is displayed on the display panel 48 when the person enters the first range A. Moreover, if the person moves from inside the first range A to outside the first range A in a state where the preview image 110 is displayed on the display panel 48, the preview image 110 is hidden when the person moves out of the first range A. At this time, the display panel 48 may shift to the light-off state as well as the preview image 110 being hidden.

The display process of the image forming apparatus 10 according to the second embodiment is described below with the flowchart; the same process as the display process described in the first embodiment have the same reference numerals, and with regard to the duplicate details, explanation is omitted, or brief explanation is given.

Figure 16:
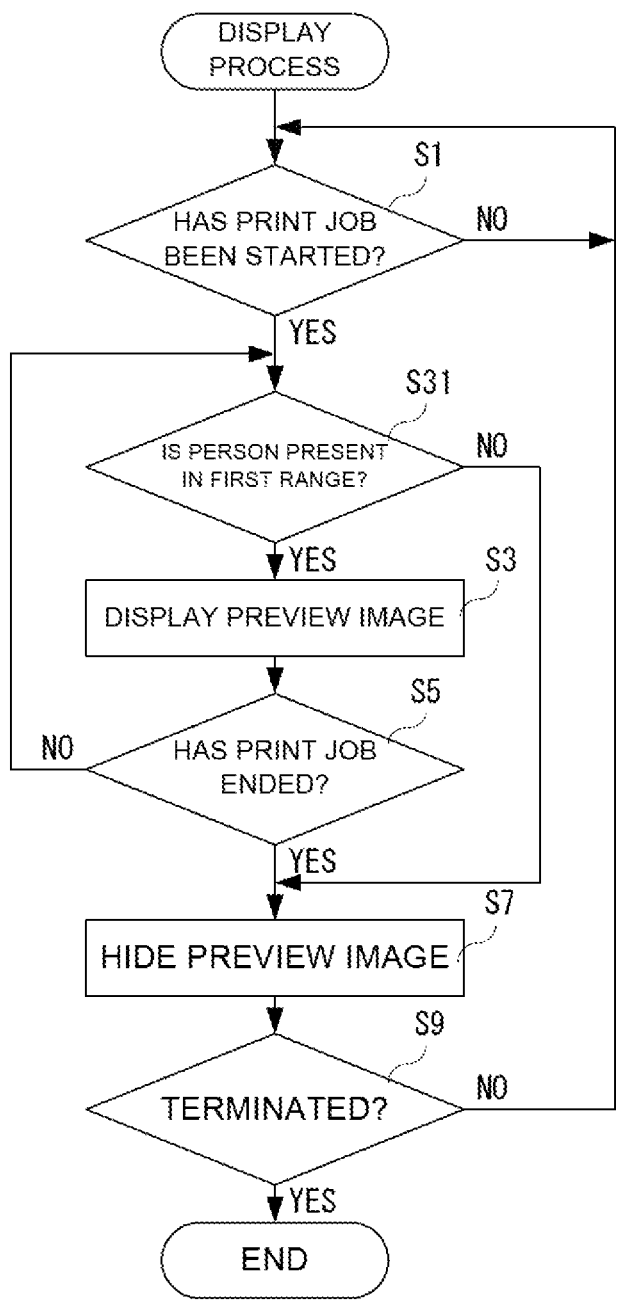
FIG. 16 is a flowchart that illustrates an example of a display process according to the second embodiment.

FIG. 16 is a flowchart that illustrates an example of the display process according to the second embodiment. As illustrated in FIG. 16, when "YES" at Step S1, i.e., when the print job has been started, after the display process has started, the CPU 82 determines whether a person is present in the first range A at Step S31.

When "NO" at Step S31, i.e., when no person is present in the first range A, a transition is made to Step S7. Here, at Step S7, if the preview image 110 is displayed, the preview image 110 is hidden. Conversely, when the preview image 110 is not displayed, the process at Step S7 is omitted.

Conversely, when "YES" at Step S31, i.e., when a person is present in the first range A, the preview image 110 is displayed at Step S3 and a transition is made to Step S5. When "NO" at Step S5, a return is made to Step S31.

Further, as the details of the process at Step S1 and the process at Step S9 are the same as those in the first embodiment, descriptions are omitted.

According to the second embodiment, as the person present near the image forming apparatus 10 may visually recognize the preview image 110, it is possible to check the content of the printed material, and it is possible to avoid taking the wrong printed material.

Furthermore, according to the second embodiment, when no person is present near the image forming apparatus 10, the preview image 110 is hidden and the display panel 48 is in the light-off state, whereby the waste of electric power may be prevented.

Third Embodiment

According to the first and the second embodiments, the up-and-down direction of the preview image 110 is the same as the front-and-rear direction of the display panel 48 (the image forming apparatus 10).

On the other hand, according to a third embodiment, the orientation of the preview image 110 is changed depending on the orientation of the person present near the image forming apparatus 10 with respect to the image forming apparatus 10.

Figure 17:
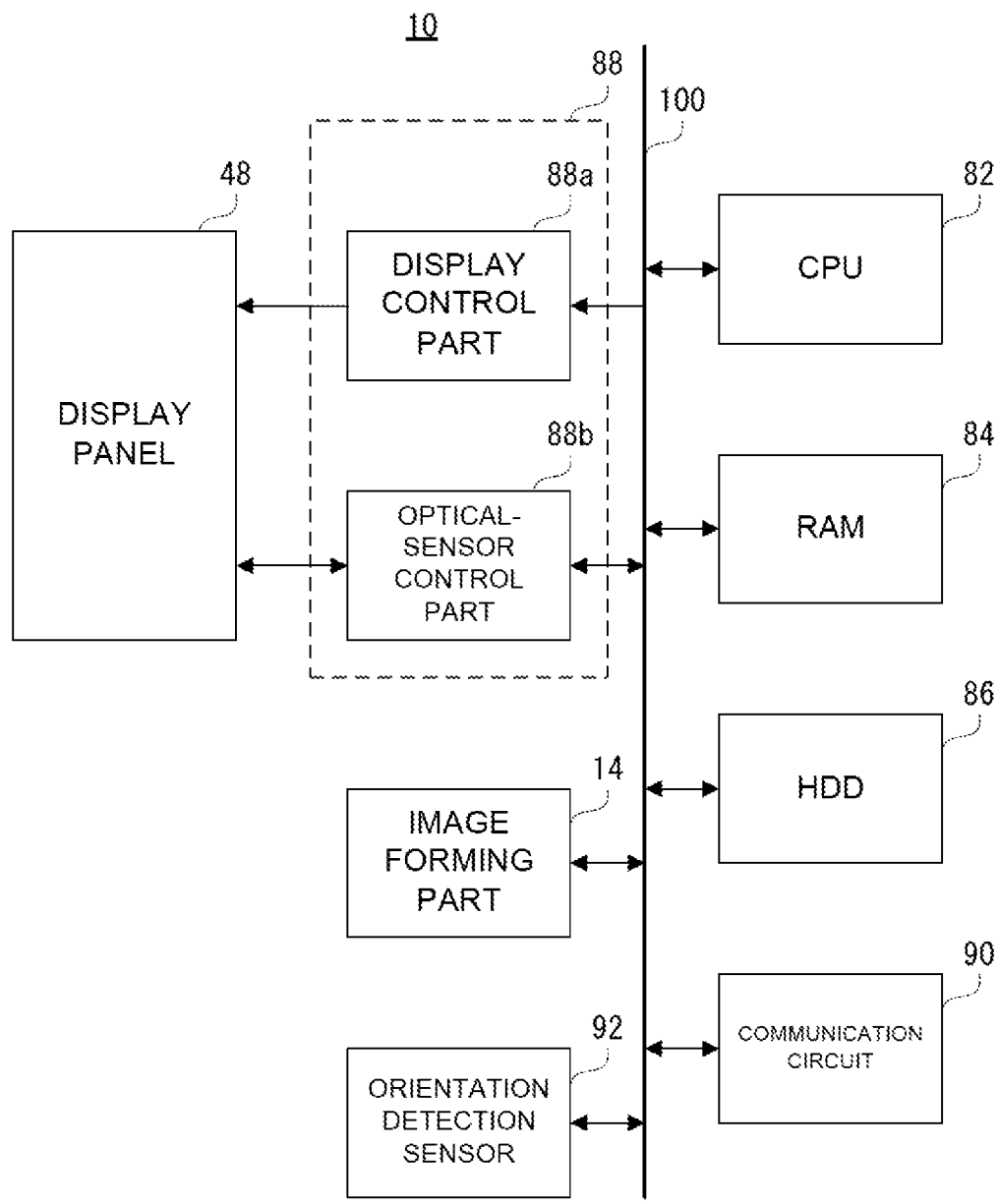
FIG. 17 is a block diagram that illustrates an electrical configuration of an image forming apparatus according to a third embodiment.

FIG. 17 is a block diagram that illustrates an electrical configuration of the image forming apparatus 10 according to the third embodiment. As illustrated in FIG. 17, the image forming apparatus 10 according to the third embodiment includes an orientation detection sensor 92 that detects the orientation of the person present near the image forming apparatus 10 with respect to the image forming apparatus 10. The orientation detection sensor 92 is connected to the CPU 82 via the bus 100.

For example, a camera is applicable as the orientation detection sensor 92. In this case, the camera outputs, to the CPU 82, captured image data corresponding to a captured image that captures the periphery of the image forming apparatus 10. The CPU 82 acquires the captured image data, output from the camera, and detects the orientation of the person present near the image forming apparatus 10 with respect to the image forming apparatus 10. The method disclosed in Japanese Patent Application Laid-Open No. 2015-2382 is applicable as a specific method for detecting the orientation of the person (the orientation of the body) present near the image forming apparatus 10 with respect to the image forming apparatus 10 by using the camera. With this method, the image information on the foot of the person present near the image forming apparatus 10 is extracted from the captured image captured by the camera, which captures an area in front of the image forming apparatus 10. Then, the positions of the ankle and the toe are determined based on the image information on the foot, and the orientation of the person present near the image forming apparatus 10 with respect to the image forming apparatus 10 is detected based on the orientation (vector) of the toe.

Here, according to the third embodiment, when a person is present (a person approaches the image forming apparatus 10) in a predetermined range in front of the image forming apparatus 10, the orientation of the person with respect to the image forming apparatus 10 is detected. For example, the predetermined range in front of the image forming apparatus 10 is the capturing range of the camera used as the orientation detection sensor 92. In this case, when it is determined that a person is included in the captured image output from the camera used as the orientation detection sensor 92, the orientation of the person with respect to the image forming apparatus 10 is detected.

Furthermore, in order to detect that a person has approached the image forming apparatus 10, a distance sensor, e.g., an infrared sensor, an ultrasonic sensor, or a laser distance sensor, like the above-described person detection sensor 46, is applicable instead of or in addition to the camera.

Furthermore, these distance sensors may function as part of the orientation detection sensor 92. For example, the orientation of the person present near the image forming apparatus 10 with respect to the image forming apparatus 10 may be detected based on both the distance data output from the distance sensor and the captured image data output from the camera. This improves the accuracy with which the orientation of the person present near the image forming apparatus 10 is detected. Moreover, there may be multiple cameras and distance sensors that function as part of the orientation detection sensor 92. This further improves the accuracy with which the orientation of the person present near the image forming apparatus 10 is detected.

Figure 18A:
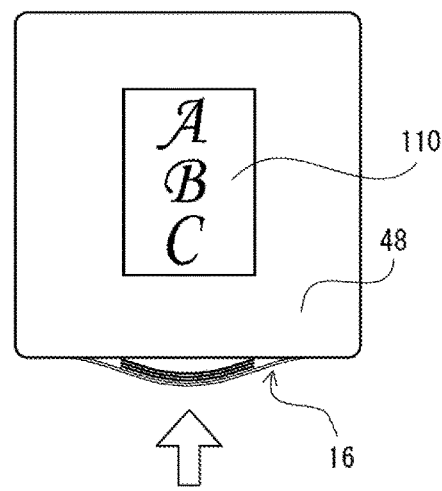
FIG. 18(A) is a plan view that illustrates a case where a person present near the image forming apparatus is facing the front side.
Figure 18B:
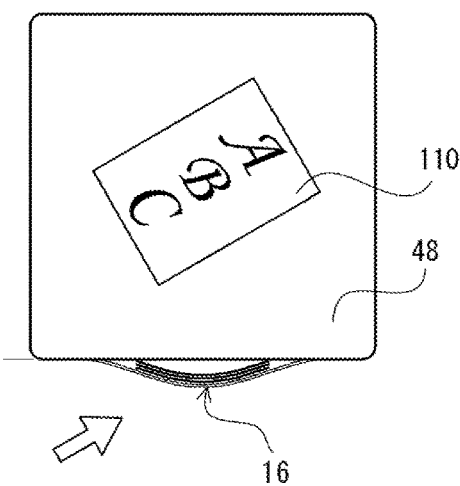
FIG. 18(B) is a plan view that illustrates a case where the person present near the image forming apparatus is facing the right rear side.
Figure 18C:
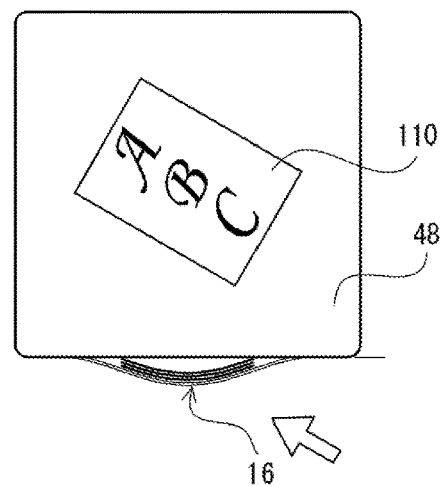
FIG. 18(C) is a plan view that illustrates a case where the person present near the image forming apparatus is facing the left rear side.

FIG. 18(A) is a plan view that illustrates a case where the person present near the image forming apparatus 10 is facing the front side. FIG. 18(B) is a plan view that illustrates a case where the person present near the image forming apparatus 10 is facing the right rear side. FIG. 18(C) is a plan view that illustrates a case where the person present near the image forming apparatus 10 is facing the left rear side. Here, the arrows illustrated in FIGS. 18(A) to (C) indicate the orientation of the person present near the image forming apparatus 10 with respect to the image forming apparatus 10.

As illustrated in FIG. 18(A), when the person present near the image forming apparatus 10 is facing the front side (when the person is going straight to the image forming apparatus 10), the preview image 110 is displayed by being orientated such that the lower side of the preview image 110 is positioned on the front surface side of the display panel 48.

On the other hand, when the person is facing the image forming apparatus 10 in a direction other than the front side, the orientation of the preview image 110 is changed (rotated). That is, the preview image 110 is rotated such that the up-and-down direction of the preview image 110 matches (coincides with) the orientation of the person with respect to the image forming apparatus 10.

For example, as illustrated in FIG. 18(B), when the person present near the image forming apparatus 10 is facing the right rear side (when the person present near the image forming apparatus 10 is approaching in a direction (the left front side) at 60° to the left with respect to the front-and-back direction of the image forming apparatus 10), the preview image 110 is rotated 60° to the right with respect to the front-and-back direction of the image forming apparatus 10. That is, the orientation is such that the upper side of the preview image 110 is positioned on the right back surface side of the display panel 48 (the lower side of the preview image 110 is positioned on the left front surface side of the display panel 48).

Furthermore, as illustrated in FIG. 18(C), when the person present near the image forming apparatus 10 is facing the left rear side (when the person present near the image forming apparatus 10 is approaching in a direction (the right front side) at 60° to the right with respect to the front-and-back direction of the image forming apparatus 10), the preview image 110 is rotated 60° to the left with respect to the front-and-back direction of the image forming apparatus 10. That is, the orientation is such that the upper side of the preview image 110 is positioned on the left back surface side of the display panel 48 (the lower side of the preview image 110 is positioned on the right front surface side of the display panel 48).

Furthermore, the up-and-down direction of the preview image 110 does not necessarily need to coincide with the direction in which the person moves. For example, the range of 60° to the left and the right with respect to the front-and-back direction of the image forming apparatus 10 may be "the front side" and, when the person present near the image forming apparatus 10 is facing the front side with respect to the image forming apparatus 10, the up-and-down direction of the preview image 110 may keep unchanged. In this case, the preview image 110 is displayed by being oriented as illustrated in FIG. 18A. Further, when the person present near the image forming apparatus 10 is facing the right rear side as compared with the front side with respect to the image forming apparatus 10, the preview image 110 may be rotated 90° to the right with respect to the front-and-back direction of the image forming apparatus 10. In this case, the preview image 110 is rotated 90° in a clockwise direction from the orientation illustrated in FIG. 18A. Similarly, when the person present near the image forming apparatus 10 is facing the left rear side as compared with the front side with respect to the image forming apparatus 10, the preview image 110 may be rotated 90° to the left with respect to the front-and-back direction of the image forming apparatus 10. In this case, the preview image 110 is rotated 90° in a counterclockwise direction from the orientation illustrated in FIG. 18A.

Furthermore, a floor sensor, or the like, is applicable as the orientation detection sensor 92 instead of the camera. When the floor sensor is used, the floor sensor is provided around the image forming apparatus 10. In this case, the CPU 82 acquires the position of the person present near the image forming apparatus 10 in chronological order in accordance with the output of the floor sensor and detects the orientation of the person present near the image forming apparatus 10 with respect to the image forming apparatus 10.

The display process of the image forming apparatus 10 according to the third embodiment is described below with the flowchart; the same process as the display process described in the second embodiment have the same reference numerals, and with regard to the duplicate details, explanation is omitted, or brief explanation is given.

Figure 19:
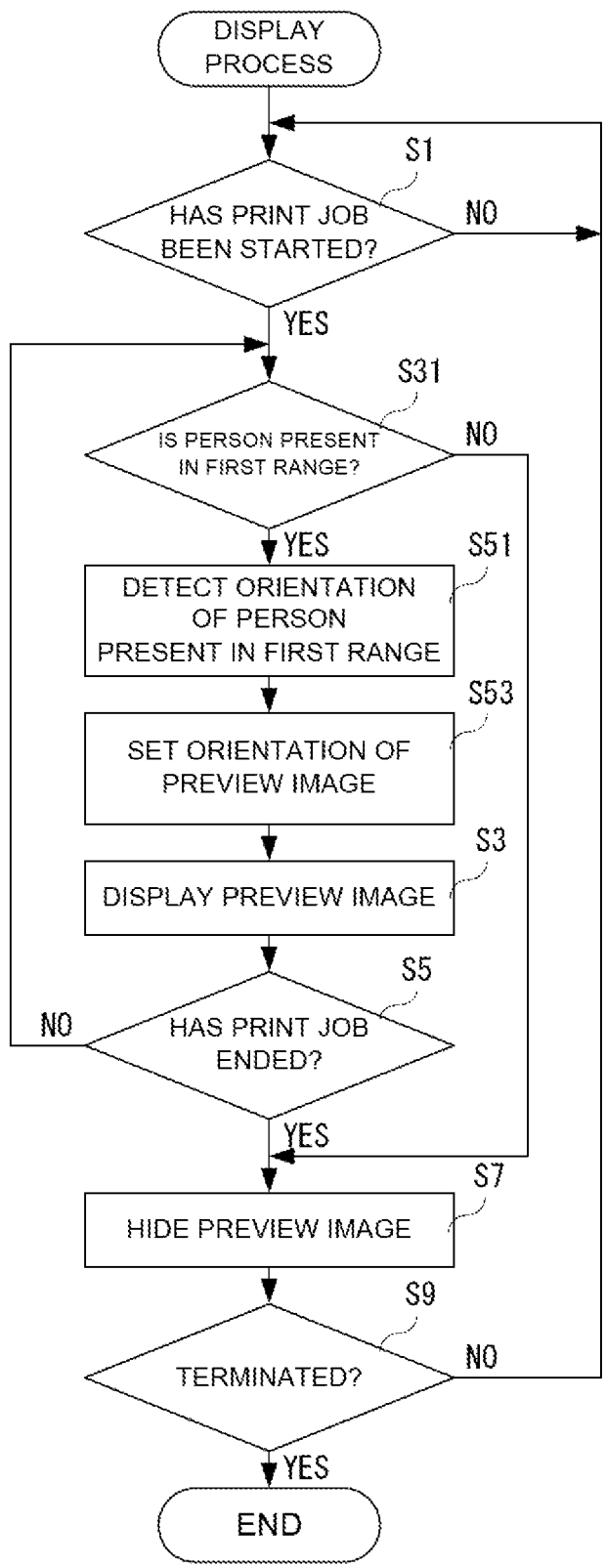
FIG. 19 is a flowchart that illustrates an example of a display process according to the third embodiment.

FIG. 19 is a flowchart that illustrates an example of the display process according to the third embodiment. As illustrated in FIG. 19, when "YES" at Step S31 after the display process has started, the CPU 82 detects the orientation of the person present in the first range A at Step S51. Then, at Step S53, the orientation of the preview image 110 is set, and a transition is made to Step S3.

As the details of the process before Step S31 and the process after Step S3 are the same as those in the second embodiment, descriptions are omitted.

According to the third embodiment, as the orientation of the preview image 110 is changed in accordance with the orientation of the person present near the image forming apparatus 10, it is easy for the person present near the image forming apparatus 10 to visually recognize the preview image 110. Thus, it is easy to check the content of the printed material, and it is possible to avoid taking the wrong printed material more effectively.

Fourth Embodiment

According to the first to the third embodiments, a print job is executed when the image forming apparatus 10 acquires the image data 304b transmitted from the external computer.

On the other hand, according to the fourth embodiment, when a user (executing user), who has given an instruction for printing from an external computer, approaches the image forming apparatus 10, the print job is executed (started) and the predetermined condition is satisfied.

According to the fourth embodiment, the user information for identifying the executing user, who has given an instruction to transmit the image data 304b, is associated with the image data 304b transmitted from the external computer. The user information includes, for example, the user name, the user ID, the employee number, etc. Further, when the executing user uses a specific computer, the user information may include the MAC address of the computer.

Then, in the image forming apparatus 10, the HDD 86 stores the image data 304b transmitted from the external computer and the user information associated with the image data 304b.

Figure 20:
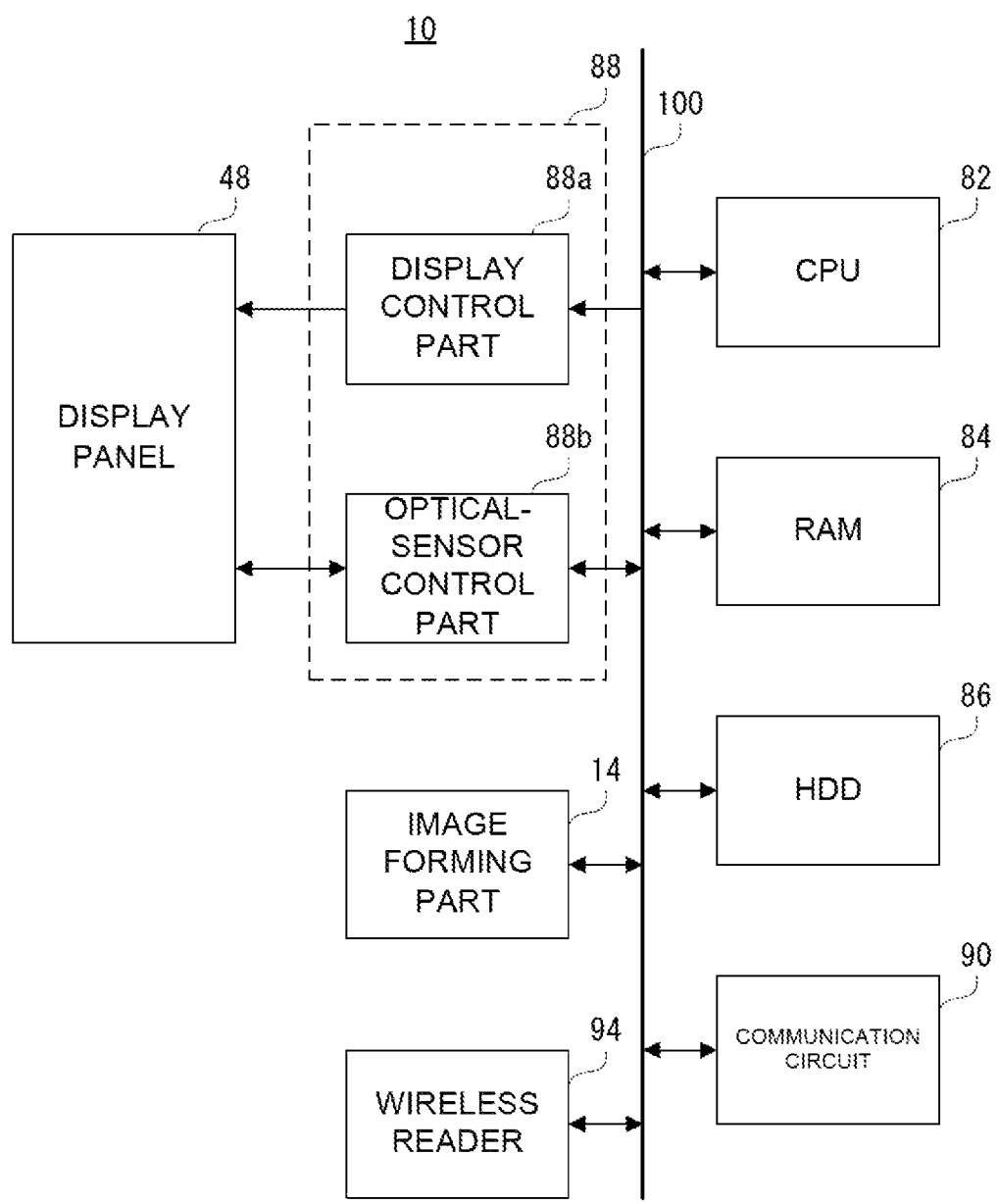
FIG. 20 is a block diagram that illustrates an electrical configuration of an image forming apparatus according to a fourth embodiment.

FIG. 20 is a block diagram that illustrates an electrical configuration of the image forming apparatus 10 according to the fourth embodiment. As a method of determining whether the executing user has approached the image forming apparatus 10, there is for example a method using an RFID system. In this case, the user carries a wireless tag (e.g., an RF tag including an RFID) including the ID corresponding to the user information. Furthermore, as illustrated in FIG. 20, the image forming apparatus 10 includes a wireless reader (e.g., an RF reader) 94 that reads the ID from the wireless tag. The wireless reader 94 is connected to the CPU 82 via the bus 100. In this way, the CPU 82 matches the ID read by the wireless reader 94 and the user information stored in the HDD 86 so as to determine whether the approaching user is the executing user. For example, the wireless tag may be included in a card, wristband, or the like, or may be built in a portable terminal carried by the user.

Furthermore, as another method of determining whether the executing user has approached the image forming apparatus 10, there is a method using Bluetooth (Bluetooth (registered trademark)) communication. In this case, the user carries a portable terminal that enables Bluetooth communications. Further, the image forming apparatus 10 includes the communication circuit 90 enabling Bluetooth communications. Moreover, the user information and the MAC address of the portable terminal are associated and stored in the image forming apparatus 10, a server on the network, or the like. In this way, when the image forming apparatus 10 detects a Bluetooth communication device, the MAC address of the device is extracted so that it is possible to determine whether the approaching user is the executing user. Moreover, when the Bluetooth communication is used, the wireless reader 94 described above may be omitted.

According to the fourth embodiment, when it is determined that the executing user has approached the image forming apparatus 10 after the image forming apparatus 10 received the image data 304b, the image data 304b is read from the HDD 86, the print job is executed, and the predetermined condition is satisfied. Furthermore, according to the fourth embodiment, it can be said that, when it is determined that the executing user has approached the image forming apparatus 10 after the image forming apparatus 10 received the image data 304b, the preview image 110 is displayed on the display panel 48.

However, according to the fourth embodiment, the print job is not executed when the executing user has not approached the image forming apparatus 10 even after the image forming apparatus 10 received the image data 304b. In this case, as the print job is not executed, the predetermined condition is not satisfied. That is, the preview image 110 is not displayed.

Further, when the preview image 110 is displayed on the display panel 48, the user information image for identifying the executing user is displayed on the display panel 48 together with the preview image 110. The user information image is displayed near the preview image 110. For example, the user information image is displayed on the right side or the left side of the preview image 110.

The user information image includes the photograph of the user's face and any image selected by the user. Furthermore, the user information image may include a message, or the like, including user information such as the user name, the user ID, or the employee number.

The user information image is associated with the above-described user information. Furthermore, the user information image may be stored together with the user information in the HDD 86 of the image forming apparatus 10 or may be transmitted from the external computer together with the image data 304b including the user information. Moreover, the user information image may be stored in an external server that is communicatively connected to the image forming apparatus 10 via a network.

Figure 21:
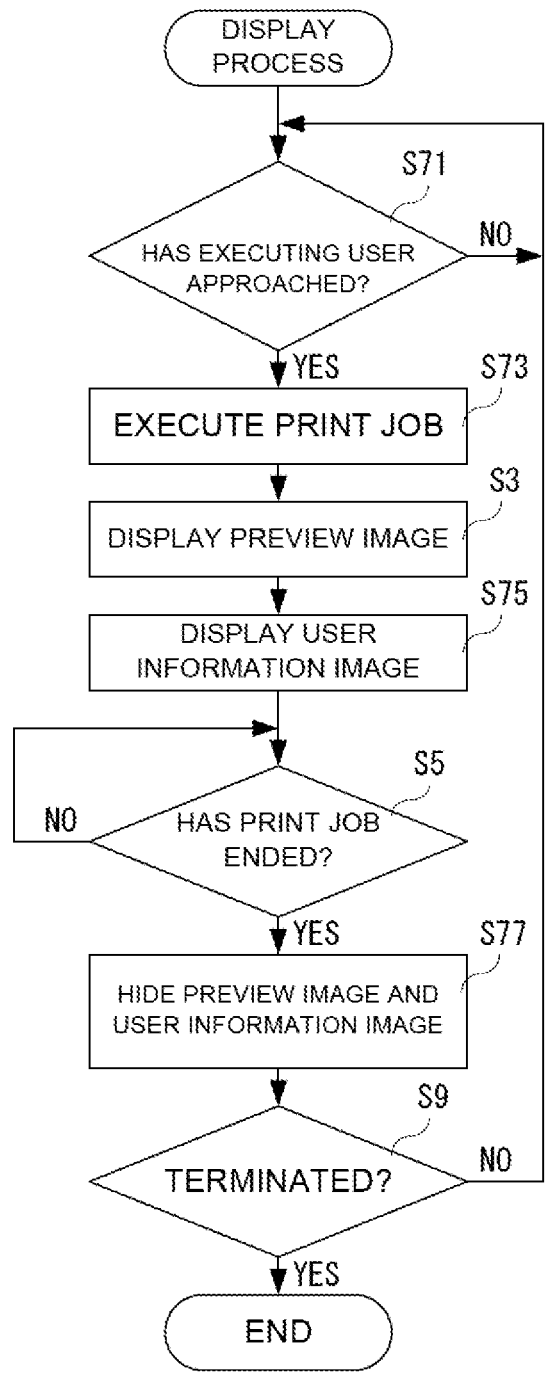
FIG. 21 is a flowchart that illustrates an example of a display process according to the fourth embodiment.

FIG. 21 is a flowchart that illustrates an example of the display process according to the fourth embodiment. Here, the display process according to the fourth embodiment starts when the image forming apparatus 10 receives the image data 304b. As illustrated in FIG. 21, the CPU 82 determines whether the executing user has approached the image forming apparatus 10 at Step S71 after the display process has started.

When "NO" at Step S71, i.e., when the executing user has not approached the image forming apparatus 10, a return is made to Step S71. Conversely, when "YES" at Step S71, i.e., when the executing user has approached the image forming apparatus 10, the print job for which the executing user has given an instruction for printing is executed at Step S73.

Then, the preview image 110 is displayed on the display panel 48 at Step S3, the user information image is displayed on the display panel 48 at Step S75, and a transition is made to Step S5.

When "YES" at Step S5, i.e., when the print job ends, the preview image 110 and the user information image are hidden at Step S77, and a transition is made to Step S9. When "NO" at Step S9, a return is made to Step S71. When "YES" at Step S9, the display process is terminated.

According to the fourth embodiment, as the print job is executed when it is determined that the executing user has approached the image forming apparatus 10, the executing user may timely collect the printed material.

Further, according to the fourth embodiment, as the print job is executed and the preview image 110 is displayed on the display panel 48 when it is determined that the executing user has approached the image forming apparatus 10, it is easy to check the content of the printed material, and it is possible to avoid taking the wrong printed material.

Furthermore, according to the fourth embodiment, as the user information image for identifying the executing user is displayed on the display panel 48 together with the preview image 110, it is easy to check the user who has given an instruction for the executed print job, and it is possible to avoid taking the wrong printed material more effectively.

Furthermore, although the print job is started when the executing user has approached the image forming apparatus 10 according to the fourth embodiment, there is no need to impose a limitation on this. For example, the start timing of the print job may be adjusted so as to discharge the sheet into the sheet discharge part 16 in synchronization with the timing in which the executing user comes to take the sheet. In this case, the CPU 82 calculates the time from when the print job is started until it ends (the execution time of the print job) and also calculates the time in which the executing user reaches the image forming apparatus 10. Here, the end of the print job means that the last sheet is discharged into the sheet discharge part 16. Then, the start timing of the print job is set in accordance with the execution time of the print job and the time in which the executing user reaches the image forming apparatus 10. In this manner, when the executing user has reached the image forming apparatus 10, the print job has ended, whereby the executing user may timely collect the printed material.

Furthermore, when multiple print jobs are stored in the HDD 86, the print job of the executing user who has first approached the image forming apparatus 10 may be executed with priority. For example, when there is a print job of a different user received prior to the print job of the executing user who has approached the image forming apparatus 10, the print job of the executing user is first executed (the execution order is switched). However, in some cases, the print job of a different user is being executed when the executing user has approached the image forming apparatus 10. In this case, the CPU 82 determines whether the print job being executed of the different user is to be stopped in accordance with the execution time of the print job being executed of the different user, the execution time of the print job of the executing user, and the time it takes for the executing user to reach the image forming apparatus 10. For example, the print job being executed is not to be stopped when the print job of the executing user will have ended before the executing user reaches the image forming apparatus 10 even if the print job of the executing user is executed after the print job of the different user ends. On the other hand, when the print job of the executing user will not have ended before the executing user reaches the image forming apparatus 10 if the print job of the executing user is executed after the print job of the different user ends, the print job being executed is stopped and the print job of the executing user is started.

Furthermore, in the case of the image forming apparatus 10 capable of stack printing, it is possible to collectively discharge multiple sheets to the sheet discharge part 16 in synchronization with the timing in which the executing user approaches the image forming apparatus 10. In this case, the image forming apparatus 10 includes a stack part so that sheets having an image formed thereon are stored in the stack part before the executing user approaches the image forming apparatus 10 and, when the executing user has approached the image forming apparatus 10, the sheets are discharged to the sheet discharge part 16. In this case, the predetermined condition may be satisfied in accordance with the discharge of the sheets from the stack part to the sheet discharge part 16.

Although the display panel 48 has an image display function, an image reading function, and a touch detection function in the case described by an example in the above embodiment, there is no need to impose a limitation. For example, an image read part having an image reading function may be provided separately from the display panel 48. In this case, the display panel 48 may have an image display function and a touch detection function. Therefore, as the display panel 48, a display with a touch panel may be used, which combines an LCD or EL (Electro-Luminescence) display and a general-purpose touch panel of an electrostatic capacitance system, an electromagnetic induction system, a resistive film system, an infrared system, or the like. Moreover, the display panel 48 may be provided in the casing 12 or may be provided in the image read part. However, the display panel 48 is disposed on the front surface side close to the standing position of the user.

Furthermore, the specific numerical values, screen configurations, and the like, described in the above embodiments are examples and may be appropriately changed depending on the actual product.

Furthermore, as for each step of the flowchart illustrated in the above embodiments, the order of processing may be changed as appropriate as long as the same result is obtained.

REFERENCE SIGNS LIST

10 Image forming apparatus
12 Casing

14 Image forming part
16 Sheet discharge part
48 Display panel
82 CPU
110 Preview image

The invention claimed is:

1. An image forming apparatus comprising:
a storage that stores input image data;
an image former that prints, on a recording medium, an image corresponding to the image data stored in the storage;
a person detector that contactlessly detects a person present in a predetermined range around the image forming apparatus;
a condition determiner that determines whether a predetermined condition that a person present in the predetermined range is detected by the person detector is satisfied; and
a display that displays a preview image corresponding to the image data when the condition determiner determines that the predetermined condition that a person present in the predetermined range is detected is satisfied.

2. The image forming apparatus according to claim 1, wherein the predetermined condition is satisfied in response to printing of the image on the recording medium by the image former.

3. The image forming apparatus according to claim 1, further comprising an orientation detector that detects an orientation of a person present in the predetermined range with respect to the image forming apparatus, wherein
the display changes an orientation of the preview image in accordance with the orientation, with respect to the image forming apparatus, of the person present in the predetermined range as detected by the orientation detector.

4. The image forming apparatus according to claim 1, wherein the predetermined condition ceases to be satisfied in response to non-detection of a person present in the predetermined range by the person detector in a state where the preview image is displayed.

5. The image forming apparatus according to claim 1, wherein the predetermined condition is satisfied in response to discharge of the recording medium on which the image is printed, into a sheet discharger of the image forming apparatus.

6. The image forming apparatus according to claim 5, wherein the predetermined condition ceases to be satisfied in response to pullout of the recording medium from the sheet discharger when the preview image is displayed.

7. The image forming apparatus according to claim 1, further comprising:
a receiver that receives the image data transmitted from an external computer; and
an approach determiner that determines whether an executing user who has given an instruction to transmit the image data has approached the image forming apparatus, wherein
the storage stores the image data received by the receiver, and
the image former prints, on a recording medium, an image corresponding to the image data stored in the storage when the approach determiner determines that the executing user has approached the image forming apparatus.

8. The image forming apparatus according to claim 7, wherein the predetermined condition is satisfied in response to a determination by the approach determiner that the executing user has approached the image forming apparatus.

9. The image forming apparatus according to claim 8, wherein the display displays, together with the preview image, a user information image for identifying the executing user when the condition determiner determines that the predetermined condition is satisfied.

10. A control program for an image forming apparatus including: a storage that stores input image data; an image former that prints, on a recording medium, an image corresponding to the image data stored in the storage; and a display,
the control program causing a computer of the image forming apparatus to function as
a person detector that contactlessly detects a person present in a predetermined range around the image forming apparatus;
a condition determiner that determines whether a predetermined condition that a person present in the predetermined range is detected by the person detector is satisfied, and
a display controller that causes the display to display a preview image corresponding to the image data when the condition determiner determines that the predetermined condition that a person present in the predetermined range is detected is satisfied.

11. A control method for an image forming apparatus including: a storage that stores input image data; an image former that prints, on a recording medium, an image corresponding to the image data stored in the storage; and a display,
the control method comprising:
(a) a step for contactlessly detecting a person present in a predetermined range around the image forming apparatus;
(b) a step for determining whether a predetermined condition that a person present in the predetermined range is detected by the person detector is satisfied; and
(c) a step for causing the display to display a preview image corresponding to the image data when it is determined that the predetermined condition that a person present in the predetermined range is detected is satisfied in the step (b).

* * * * *